US011268666B2

(12) United States Patent
Steadman et al.

(10) Patent No.: US 11,268,666 B2
(45) Date of Patent: *Mar. 8, 2022

(54) LIGHT FIXTURE WITH NARROW LIGHT DISTRIBUTION

(71) Applicant: Hubbell Incorporated, Shelton, CT (US)

(72) Inventors: Connie Anna Steadman, Taylors, SC (US); Shawn Ard Wilcox, Gray Court, SC (US)

(73) Assignee: Hubbell Incorporated, Shelton, CT (US)

( * ) Notice: Subject to any disclaimer, the term of this patent is extended or adjusted under 35 U.S.C. 154(b) by 2 days.

This patent is subject to a terminal disclaimer.

(21) Appl. No.: 16/692,312

(22) Filed: Nov. 22, 2019

(65) Prior Publication Data

US 2020/0088367 A1    Mar. 19, 2020

Related U.S. Application Data

(63) Continuation of application No. 15/463,714, filed on Mar. 20, 2017, now Pat. No. 10,502,375.

(Continued)

(51) Int. Cl.
*F21S 8/02*    (2006.01)
*F21V 13/04*    (2006.01)
(Continued)

(52) U.S. Cl.
CPC ............ *F21S 8/026* (2013.01); *F21V 7/0083* (2013.01); *F21V 13/04* (2013.01); *F21V 5/002* (2013.01);
(Continued)

(58) Field of Classification Search
CPC .......... F21S 8/026; F21V 13/04; F21V 5/002; F21V 7/0083; F21Y 2105/18; F21Y 2115/10; G02B 27/30
See application file for complete search history.

(56) References Cited

U.S. PATENT DOCUMENTS

| 4,858,067 A | 8/1989 | Rochellr |
| 5,094,788 A | 3/1992 | Schrenk et al. |

(Continued)

OTHER PUBLICATIONS

TIR Lens Guide, LEDiL, available before Mar. 21, 2016, 8 pages, LEDiL Oy, Finland.

(Continued)

*Primary Examiner* — Tsion Tumebo
(74) *Attorney, Agent, or Firm* — Michael Best & Friedrich LLP

(57) ABSTRACT

A light fixture includes a circuit board having a plurality of light-emitting elements, and a plurality of collimators positioned adjacent the circuit board. Each of the collimators includes a first end positioned adjacent one of the light-emitting elements, a second end, and an interior wall extending between the first end and the second end. The wall is curved to internally reflect the light output of the associated light-emitting element and focus the light through the second end and provide a light distribution. The light fixture further includes a beam controlling optic positioned adjacent the second end of the plurality of collimators to modify the light output from the plurality of collimators to provide a modified light distribution.

17 Claims, 17 Drawing Sheets

Related U.S. Application Data

(60) Provisional application No. 62/311,068, filed on Mar. 21, 2016.

(51) Int. Cl.
  *F21V 7/00* (2006.01)
  *G02B 27/30* (2006.01)
  *F21V 29/76* (2015.01)
  *F21Y 115/10* (2016.01)
  *F21V 29/51* (2015.01)
  *F21Y 105/18* (2016.01)
  *F21V 5/00* (2018.01)

(52) U.S. Cl.
  CPC ............. *F21V 29/51* (2015.01); *F21V 29/767* (2015.01); *F21Y 2105/18* (2016.08); *F21Y 2115/10* (2016.08); *G02B 27/30* (2013.01)

(56) References Cited

U.S. PATENT DOCUMENTS

| | | | |
|---|---|---|---|
| 5,122,905 A | 6/1992 | Wheatley | |
| 5,269,995 A | 12/1993 | Ramanathan et al. | |
| 5,389,324 A | 2/1995 | Lewis et al. | |
| 5,588,737 A | 12/1996 | Kusmer | |
| 5,882,774 A | 3/1999 | Jonza et al. | |
| 5,957,574 A | 9/1999 | Hentz | |
| 5,976,424 A | 11/1999 | Weber et al. | |
| 6,080,467 A | 6/2000 | Weber et al. | |
| 6,088,163 A | 7/2000 | Gilbert et al. | |
| 6,101,032 A | 8/2000 | Wortman et al. | |
| 6,117,530 A | 9/2000 | Jonza et al. | |
| 6,157,490 A | 12/2000 | Wheatley et al. | |
| 6,208,466 B1 | 3/2001 | Liu et al. | |
| 6,210,785 B1 | 4/2001 | Weber et al. | |
| 6,296,927 B1 | 10/2001 | Jonza et al. | |
| 6,352,359 B1* | 3/2002 | Shie | F21S 41/28 362/522 |
| 6,994,457 B2 | 2/2006 | Lee | |
| 7,438,433 B1 | 10/2008 | Steadman | |
| 7,478,931 B2 | 1/2009 | Miletich | |
| 7,629,570 B2* | 12/2009 | Mondloch | H05B 45/00 250/227.11 |
| 7,658,517 B2 | 2/2010 | Czech | |
| 7,703,951 B2 | 4/2010 | Piepgras | |
| 7,722,227 B2 | 5/2010 | Zhang | |
| 8,070,328 B1* | 12/2011 | Knoble | F21V 29/773 362/311.02 |
| 8,128,263 B2* | 3/2012 | Higuchi | F21V 29/86 362/373 |
| 8,480,268 B2 | 7/2013 | Wilson | |
| 8,854,796 B2 | 10/2014 | Wilcox | |
| 8,926,133 B2 | 1/2015 | Booth | |
| 8,926,145 B2* | 1/2015 | Lynch | F21V 29/773 362/373 |
| 9,068,722 B2 | 6/2015 | Wronski | |
| 9,234,647 B2* | 1/2016 | Gabrius | F21V 29/713 |
| 9,506,611 B2 | 11/2016 | Ramirez | |
| 9,696,022 B2 | 7/2017 | Mandy | |
| 9,903,575 B2 | 2/2018 | Ilenbiluan | |
| 10,281,112 B1* | 5/2019 | Pyshos | F21V 5/04 |
| 2004/0027832 A1 | 2/2004 | Hyder | |
| 2006/0262544 A1* | 11/2006 | Piepgras | F21V 29/763 362/373 |
| 2008/0137347 A1 | 6/2008 | Trott | |
| 2009/0103293 A1* | 4/2009 | Harbers | F21K 9/65 362/231 |
| 2009/0284972 A1* | 11/2009 | Chang | F21V 29/717 362/249.02 |
| 2009/0290343 A1 | 11/2009 | Brown | |
| 2009/0290361 A1 | 11/2009 | Ruud | |
| 2010/0053950 A1 | 3/2010 | Higuchi | |
| 2010/0061108 A1 | 3/2010 | Zhang | |
| 2010/0128491 A1* | 5/2010 | Hashimoto | F21V 23/006 362/365 |
| 2010/0149822 A1 | 6/2010 | Cogliano | |
| 2010/0195327 A1 | 8/2010 | Inoue | |
| 2010/0204841 A1* | 8/2010 | Chemel | H05B 45/20 700/282 |
| 2010/0208460 A1* | 8/2010 | Ladewig | F21V 29/75 362/235 |
| 2010/0253591 A1* | 10/2010 | Hwu | G02B 3/08 345/1.3 |
| 2011/0044047 A1 | 2/2011 | Mandy | |
| 2011/0211346 A1 | 9/2011 | Ogawa | |
| 2011/0216547 A1 | 9/2011 | Honda | |
| 2012/0320577 A1 | 12/2012 | Wang | |
| 2013/0094225 A1 | 4/2013 | Leichner | |
| 2013/0265755 A1 | 10/2013 | Adams | |
| 2013/0265760 A1 | 10/2013 | Demuynck et al. | |
| 2014/0085912 A1 | 3/2014 | David | |
| 2014/0268836 A1 | 9/2014 | Thompson | |
| 2014/0307445 A1* | 10/2014 | Highbridge | F21V 21/042 362/296.01 |
| 2015/0252988 A1* | 9/2015 | Rashidi Doust | F21S 8/026 362/285 |

OTHER PUBLICATIONS

"3M Specular Film Protected—D50F", Technical Data Sheet, Dec. 2013, Release A, 3 pages, 3M Company.

"Specifications for Warm White LED", Nichia Catalog, available before Mar. 21, 2016, 19 pages, Catalog No. 130326, Nichia Corporation.

\* cited by examiner

LIGHT FIXTURE WITH NARROW LIGHT DISTRIBUTION

CROSS-REFERENCE TO RELATED APPLICATION

This application is a continuation of prior-filed U.S. patent application Ser. No. 15/463,714, filed Mar. 20, 2017, which claims the benefit of U.S. Provisional Patent Application No. 62/311,068, filed Mar. 21, 2016. The entire contents of the above-identified applications are incorporated by reference herein.

FIELD

The present application relates to directional light fixtures, and particularly to a light fixture exhibiting a narrow light distribution.

SUMMARY

Light emitting diodes (LEDs) are solid state devices that convert electric energy into light. Light emitted by an LED progresses outwardly into a solid angle of $2\pi\omega$ (i.e., a generally Lambertian distribution). In other words, luminous flux, or useful light emitted by the LED progresses outwardly in a near hemispherical distribution. The vertical distribution of light ranges from zero degrees (i.e., zenith or nadir depending on orientation of the LED) to nearly ninety degrees. The horizontal distribution of light is 360 degrees.

Some challenges associated with LED-based light fixtures are light fixture size, heat management, and light efficiency. Due to the fact that LEDs can draw large electric currents, heat sinks are typically used to dissipate the generated heat. The heat sinks can be large and greatly increase the overall size of the light fixture. Since LEDs emit light in a hemispherical pattern, LEDs are optically inefficient when a narrow beam of light is desired, thus requiring more LEDs for the same light output. Consequently, a larger heat sink must be used in order to manage the increased output in heat from the increased number of LEDs, which is difficult when the size of the light fixture must be compact. For recess lighting, for example, a compact design is desired because the light fixture must fit entirely within a ceiling space, but the lighting distribution is often inefficient because light cannot be emitted in a full hemispherical pattern. In order to control light to a greater degree (e.g., make a narrower pattern), larger optical components are required for both refractive and reflective materials. The components and materials can be too large or too costly for this application. As such, currently, in order to produce a narrow beam with components that will fit through a ceiling opening the optical efficiency of the fixture must be sacrificed.

In one aspect, a light fixture includes a circuit board including a plurality of light-emitting elements, and a plurality of collimators positioned adjacent the circuit board. Each of the collimators includes a first end positioned adjacent one of the light-emitting elements, a second end, and an interior wall that extends between the first end and the second end. The wall is curved to internally reflect the light output of the associated light-emitting element and focus the light through the second end and provide a light distribution. The light fixture includes a beam controlling optic positioned adjacent the second end of the plurality of collimators to modify the light output from the plurality of collimators to provide a modified light distribution.

In another aspect, light fixture includes a frame including an opening having an inner dimension, and a reflector assembly that is removably supported within the opening of the frame. The light fixture further includes a power supply assembly removably supported by the frame. The power supply assembly has a length and a maximum dimension transverse to the length. The maximum dimension of the power supply assembly is less than the inner dimension of the opening to allow the power supply assembly to be removed through the opening in the frame.

In yet another aspect, a light fixture includes a frame including an opening having an inner dimension and a reflector assembly that is removably supported within the opening of the frame. The light fixture further includes a light distribution assembly removably supported by the frame. The light distribution assembly has a length and a maximum dimension transverse to the length. The maximum dimension is less than the inner dimension of the opening to allow the light distribution assembly to be removed through the opening in the frame.

Other aspects of the application will become apparent by consideration of the detailed description and accompanying drawings.

BRIEF DESCRIPTION OF THE DRAWINGS

FIG. 4A is an end view of the power supply assembly of FIG. 4.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or hydraulic connections or couplings, whether direct or indirect. Also, electronic communications and notifications may be performed using any known means including direct connections, wireless connections, etc.

Figure 1:
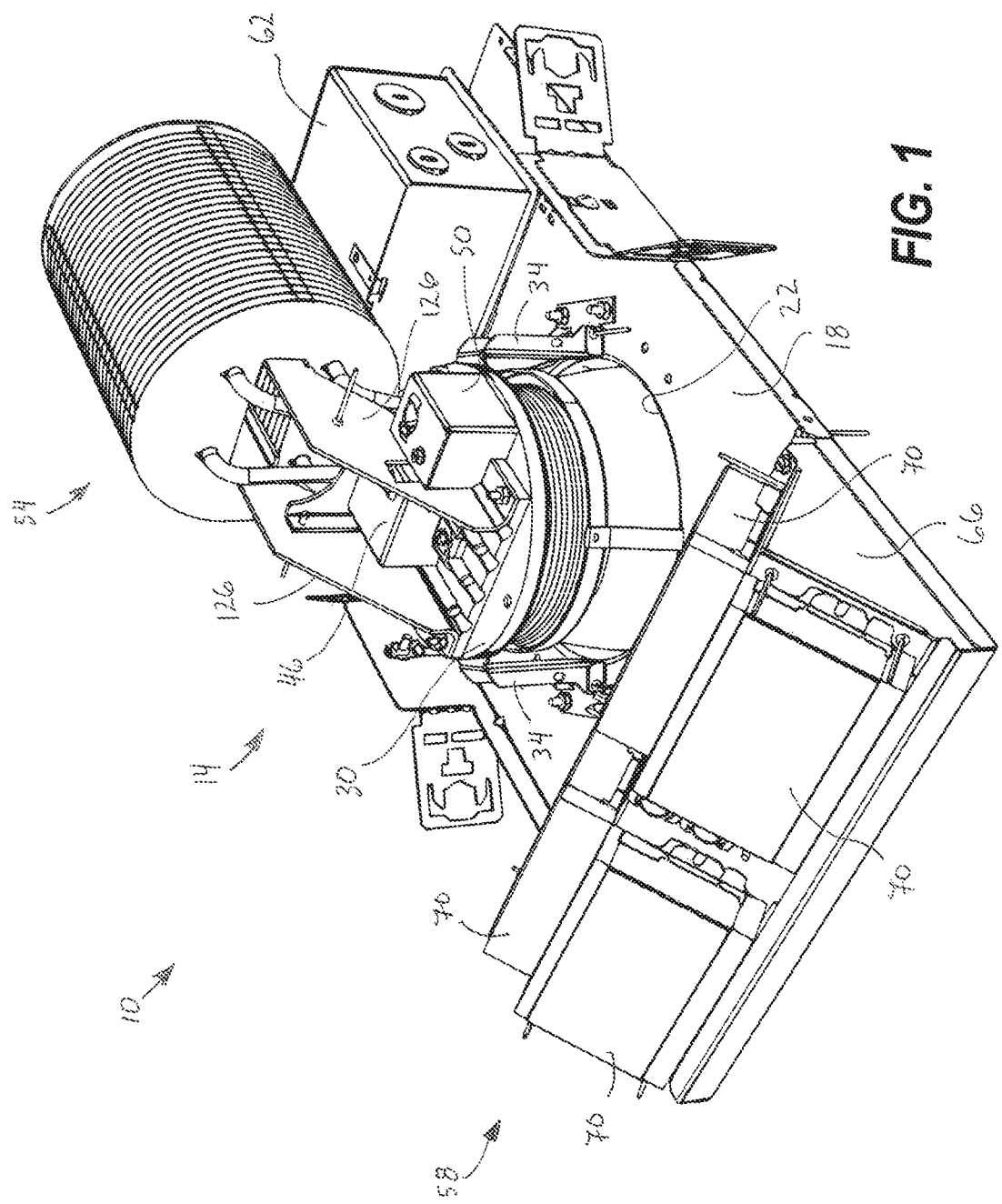
FIG. 1 is a first perspective view of a light fixture.
Figure 2:
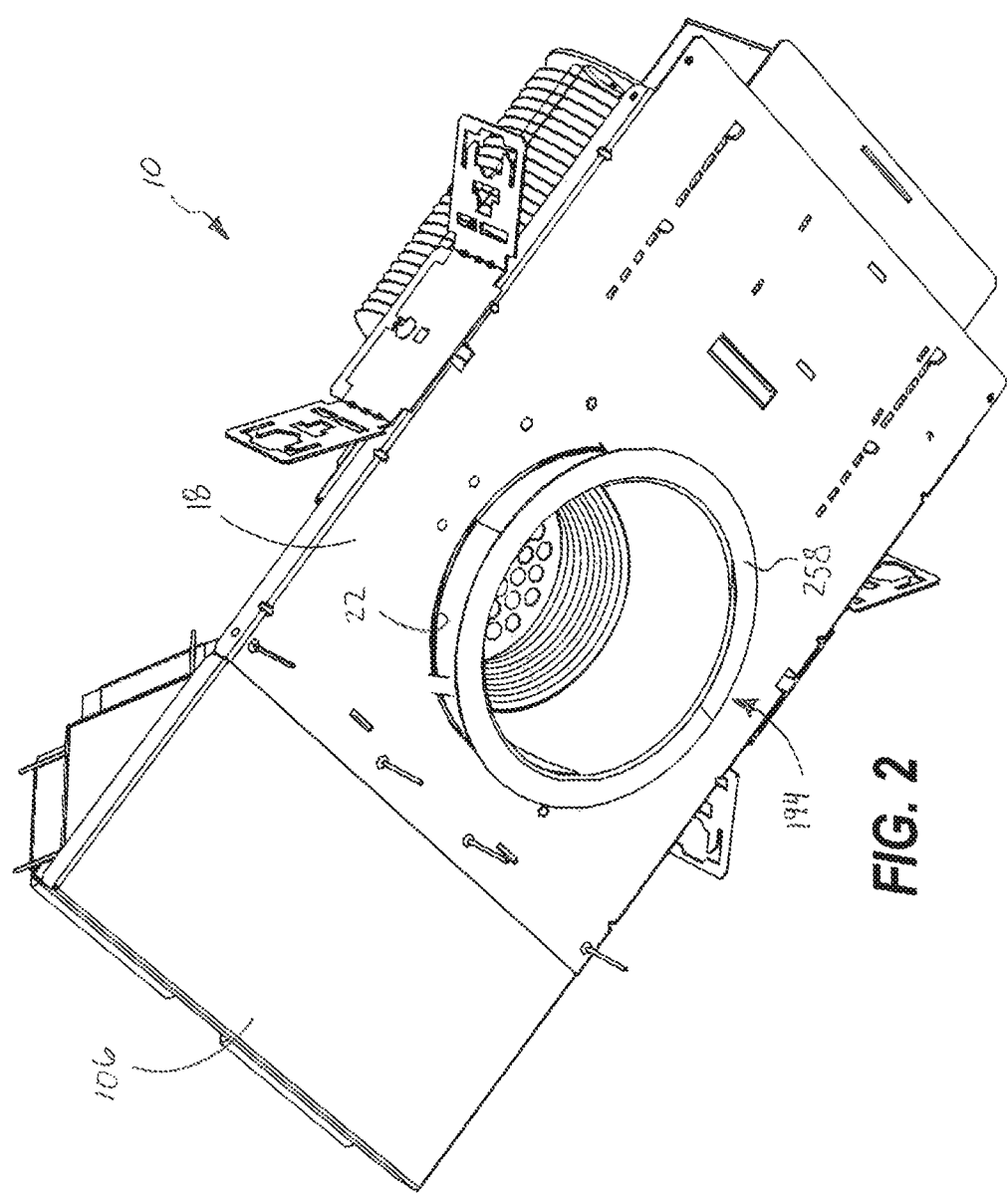
FIG. 2 is a second perspective view of the light fixture of FIG. 1.
Figure 3:
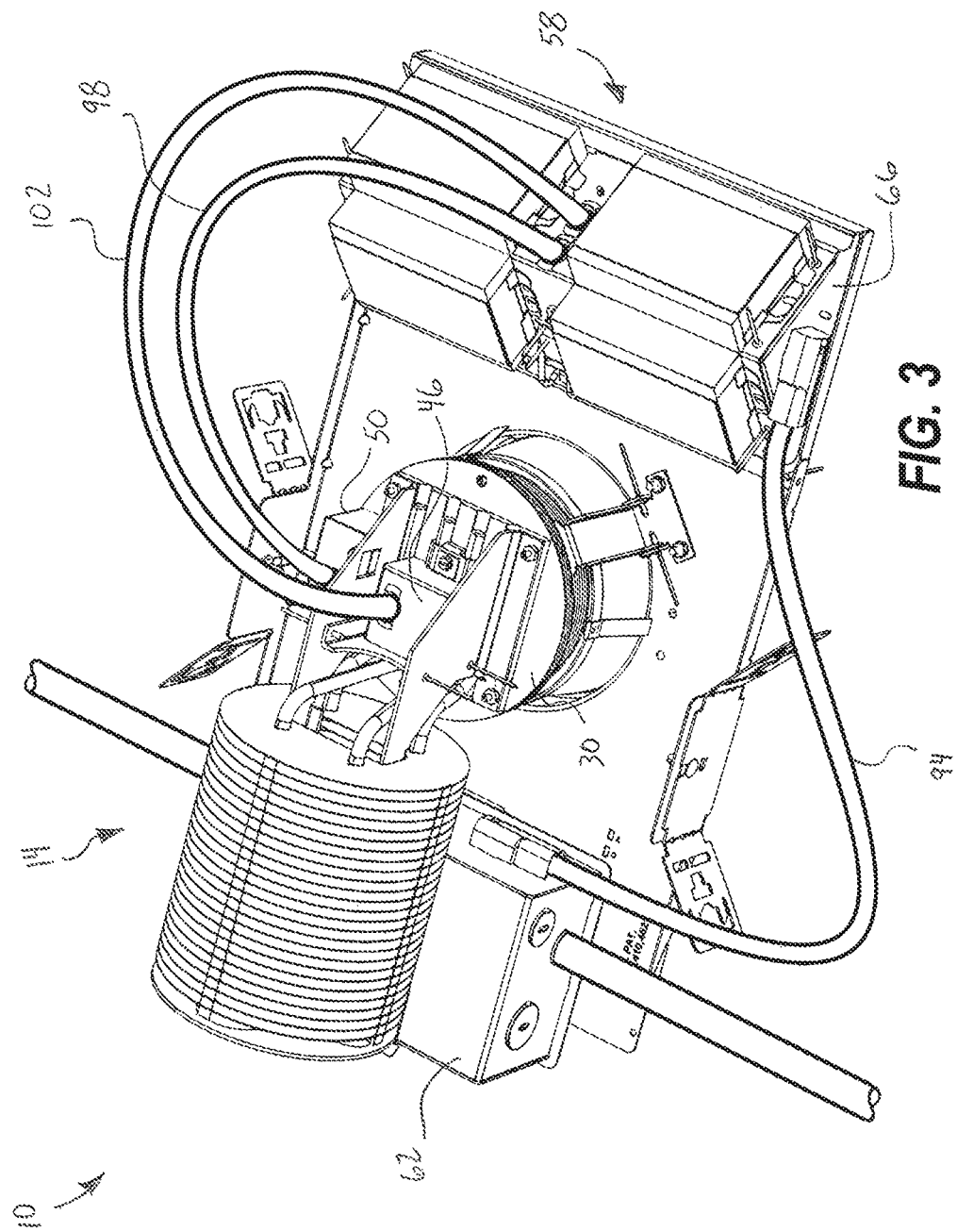
FIG. 3 is a third perspective view of the light fixture of FIG. 1 and associated electrical connections.

FIGS. 1-3 illustrate a luminaire or light fixture 10 according to one embodiment. In the illustrated embodiment, the light fixture 10 is a recessed light fixture that may be positioned within, for example, a ceiling space or a wall space such that the exterior portion of the fixture is substantially flush with the ceiling surface or wall surface. The light fixture 10 provides a distribution of output light.

Referring to FIG. 1, the light fixture 10 includes a light distribution assembly 14 that is supported by and mounted on a chassis or support frame 18, and a portion of the light distribution assembly 14 that extends through an opening 22 in the support frame 18. The opening 22 has an inner dimension 26 (i.e., inner diameter). In some embodiments, the support frame 18 may be covered with plaster or another suitable material.

The light distribution assembly 14 includes a circuit board 30 that is supported relative to the support frame 18 by pivoting support members 34. In particular, each support member 34 may include a first end pivotably coupled to the support frame 18. A second end of each support member 34 may be coupled to the circuit board 30, e.g., by one or more fasteners. In some embodiments, the circuit board 30 includes light emitting elements such as light emitting diode (LED) modules or sets, each of which include at least one LED (an example of the LED modules 38 and LEDs 42 are shown in FIG. 14). In addition, a safety device (not shown) enclosed by a safety device connector cover 46, and a circuit board connector (not shown) enclosed by a circuit board connector cover 50 are mounted on the circuit board 30. In addition, a heat sink 54 is coupled to the circuit board 30 to provide heat dissipation for the LEDs mounted on the circuit board.

Figure 4:
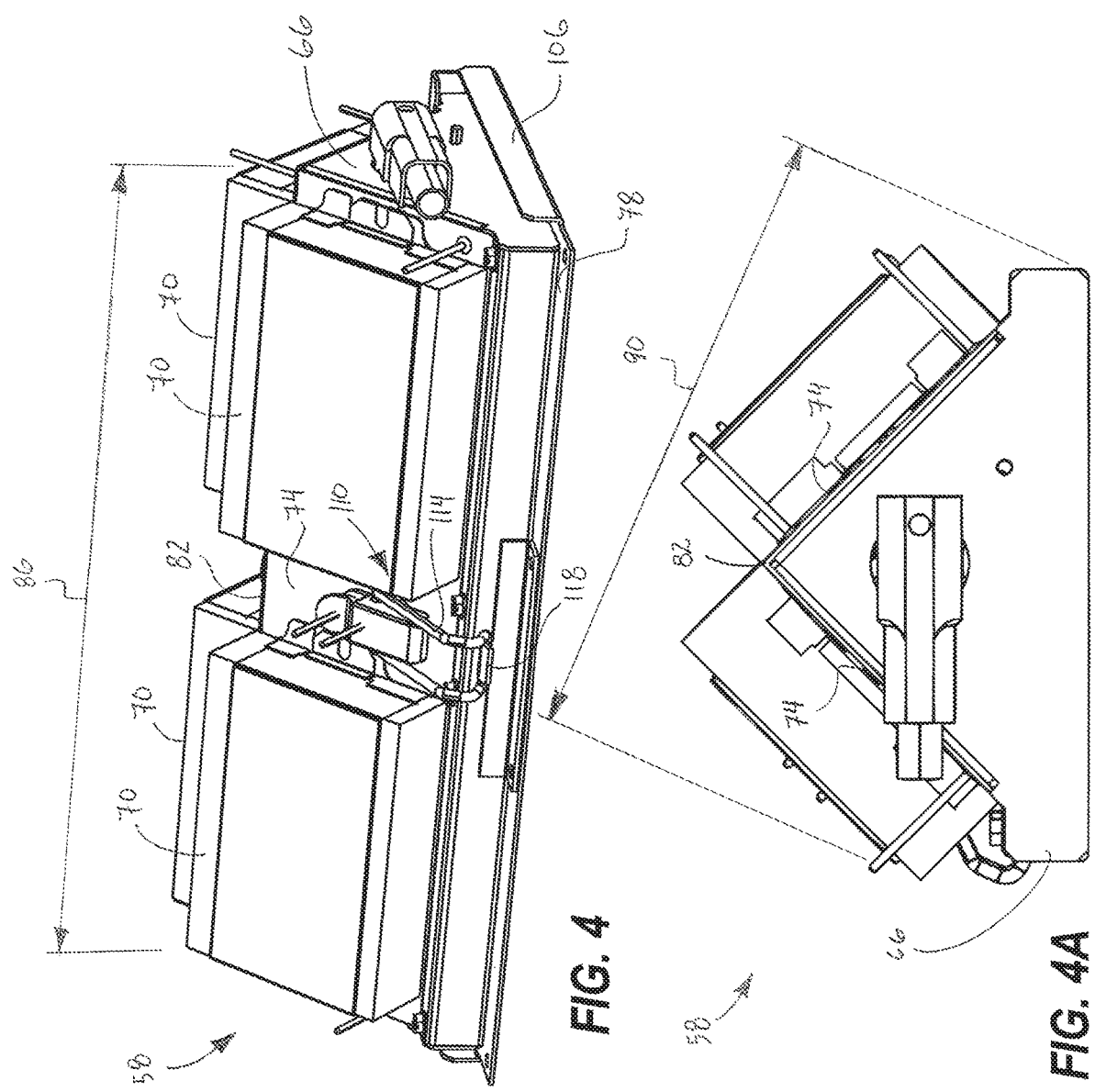
FIG. 4 is a perspective view of a power supply assembly.

The light fixture 10 further includes a removable power supply assembly 58 and an electrical junction box 62 that receives electrical wires (FIG. 3). The power supply assembly 58 includes a power supply positioned within a power supply enclosure 66, and driver(s) 70. As best shown in FIGS. 4-4A, the power supply enclosure 66 includes inclined walls 74 extending from a flat base 78 and joined at an apex 82 to define a triangular prism shape along a length 86 of the power supply enclosure 66. The drivers 70 are coupled to the inclined walls 74 of the power supply enclosure 66. The inclined walls 74 defining the prism shape of the power supply enclosure 66 reduce a maximum dimension 90 (FIG. 4A) of the power supply assembly 58 in a plane transverse to the length 86 of the power supply assembly 58 even when the drivers 70 are attached. In some embodiments, the maximum dimension 90 of the power supply assembly 58 is an outer dimension. The electrical junction box 62 (FIG. 3) is electrically connected to the removable power supply assembly 58 through the power supply enclosure 66 via a first wiring harness 94. The LEDs are electrically connected via a second wiring harness 98 extending between the circuit board connector cover 50 (FIG. 3) and the removable power supply assembly 58. The shape of the power supply assembly 58 also provides sufficient surface area and space for the first and second wiring harnesses 94, 98 to be connected to the power supply assembly 58. The LEDs are controlled by the driver(s) 70, as described in more detail below. A third wiring harness 102 (FIG. 3) connects the power supply enclosure 66 and the safety device connector cover 46.

With reference to FIG. 4, the power supply assembly 58 is independent and separate from the electrical junction box 62 (FIG. 3) and is independently supported on a power supply assembly tray 106 of the support frame 18. The power supply assembly 58 is removable from the tray 106 to permit accessibility for servicing, such that the power supply assembly 58 including the drivers 70 and corresponding wiring may be removed from the support frame 18 and lowered below the ceiling through the opening 22 for examination and replacement. The power supply assembly 58 includes a latch assembly 110 on the power supply enclosure 66 for securing the power supply assembly 58 to the support frame 18 within the tray 106 so that the power supply assembly 58 including the drivers 70 and wiring harnesses 94, 98, 102 may be readily detached and removed. The latch assembly 110 includes a pivotal latch member 114 pivotably attached to the power supply enclosure 66 and a catch member 118 extending from the tray 106. The latch assembly 110 is movable between an engaged position, in which the latch member 114 engages the catch member 118 to secure the power supply assembly 58 to the tray 106 of the support frame 18, and a disengaged position (not shown), in which the latch member 114 disengages from the catch member 118 to allow the power supply assembly 58 to be lifted out of the tray 106 (FIG. 13) and removed from the frame 18 through the opening 22. The triangular prism shape of the power supply enclosure 66 reduces the maximum transverse dimension 90 (FIG. 4A) of the power supply assembly 58 to allow the power supply assembly 58 to be removed from an opening 22 having a smaller inner dimension than if the power supply enclosure 66 had another enclosure shape (e.g., a rectangular box shape). In the illustrated embodiment, the opening 22 is circular and the diameter (i.e., the inner dimension 26) is approximately 6 inches. In some embodiments, the opening 22 may be larger or smaller. In some embodiments, the opening 22 may have another shape. In some embodiments, the power supply assembly 58 and the power supply enclosure 66 may be sized according to the size and shape of the opening 22.

Figure 5:
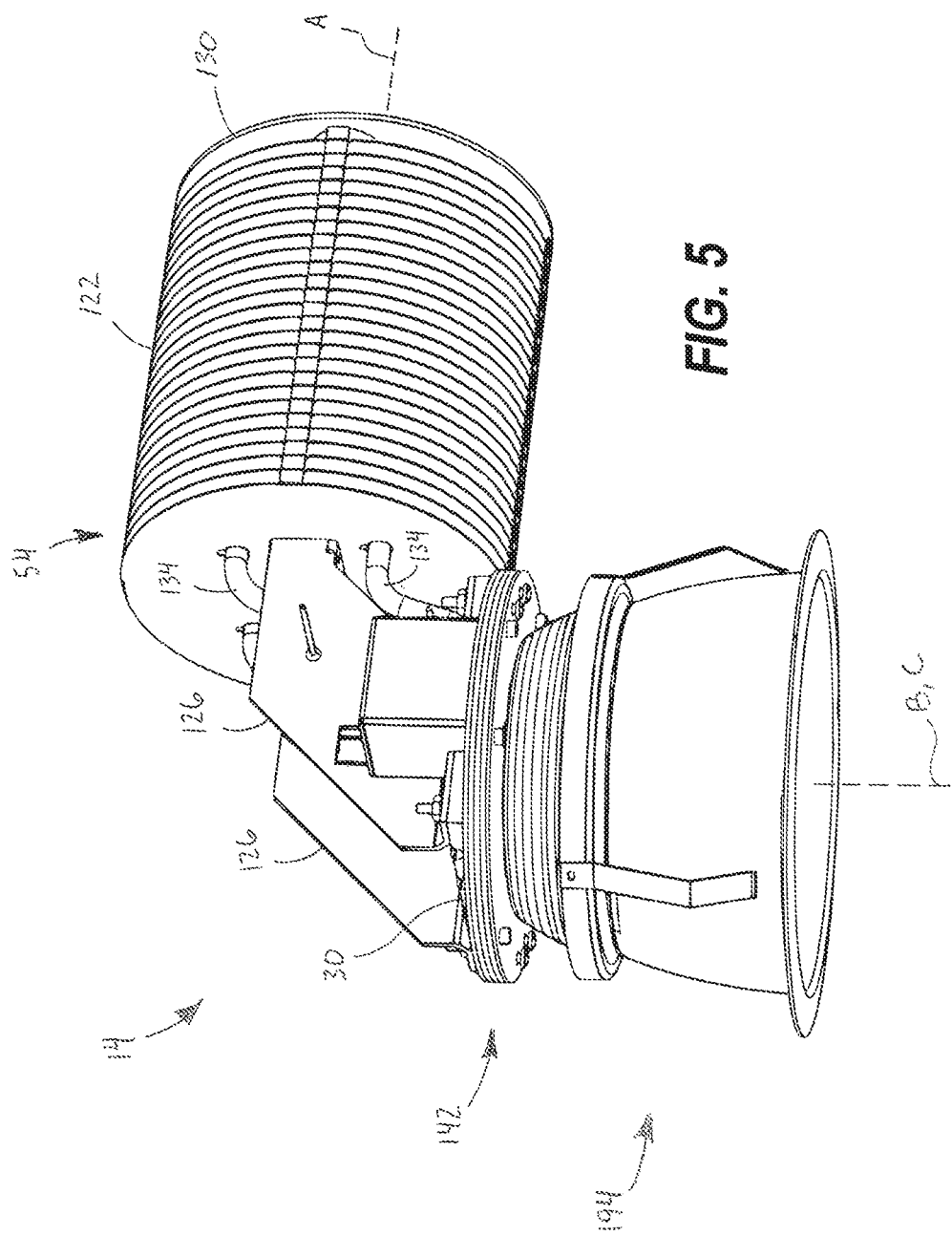
FIG. 5 is a perspective view of a light distribution assembly.

With reference to FIG. 5, the heat sink 54 includes a fin assembly 122 that is supported on the circuit board 30 by angled brackets 126. Each bracket 126 includes a first end coupled to the circuit board 30 and a second end coupled to the fin assembly 122 of the heat sink 54. Each bracket 126 extends through an angle of between approximately 75 degrees and approximately 120 degrees. Each bracket 126 includes a portion extending through the fin assembly 122 to a fin assembly end plate 130 that helps protect the fin assembly 122 from being bent or damaged during installation (e.g., while being inserted through the opening 22 in the frame 18). The circuit board 30 and fin assembly 122 are supported on the support frame 18 by the pivoting support members 34 (FIG. 1) such that a central axis A of the fin assembly 122 extends perpendicular relative to a central axis B of the circuit board 30. In some embodiments, the heat sink 54 is positioned adjacent the circuit board 30. Arranging the central axis A of the fin assembly 122 perpendicularly with respect to the central axis B of the circuit board 30 reduces the height and/or length of the fixture 10 and provides a compact design for the light fixture 10. The cooling fins of the fin assembly 122 are vertically arranged to facilitate air flow through the fin assembly 122, providing convection cooling to remove heat from the heat sink 54. Also, a plurality of heat pipes 134 extend between the circuit board 30 and the fins of the fin assembly 122 to draw away heat that is emitted by the LEDs 42 on the circuit board 30. In some embodiments, the heat pipes 134 are a part of a two-phase, self-contained cooling system.

Due to the arrangement of the heat sink 54, the center of mass of the light fixture 10 is shifted away from the dimensional center of the support frame 18, which may cause bending and torque stresses on the support frame 18. However, as shown in FIGS. 1 and 3, the power supply assembly 58 is arranged on an end of the support frame 18 opposite the heat sink 54 to offset the weight of the heat sink 54 and the junction box 62. Also, positioning the drivers 70 away from the heat sink 54 reduces the possibility that heat from the heat sink 54 would affect the drivers 70.

Figure 6:
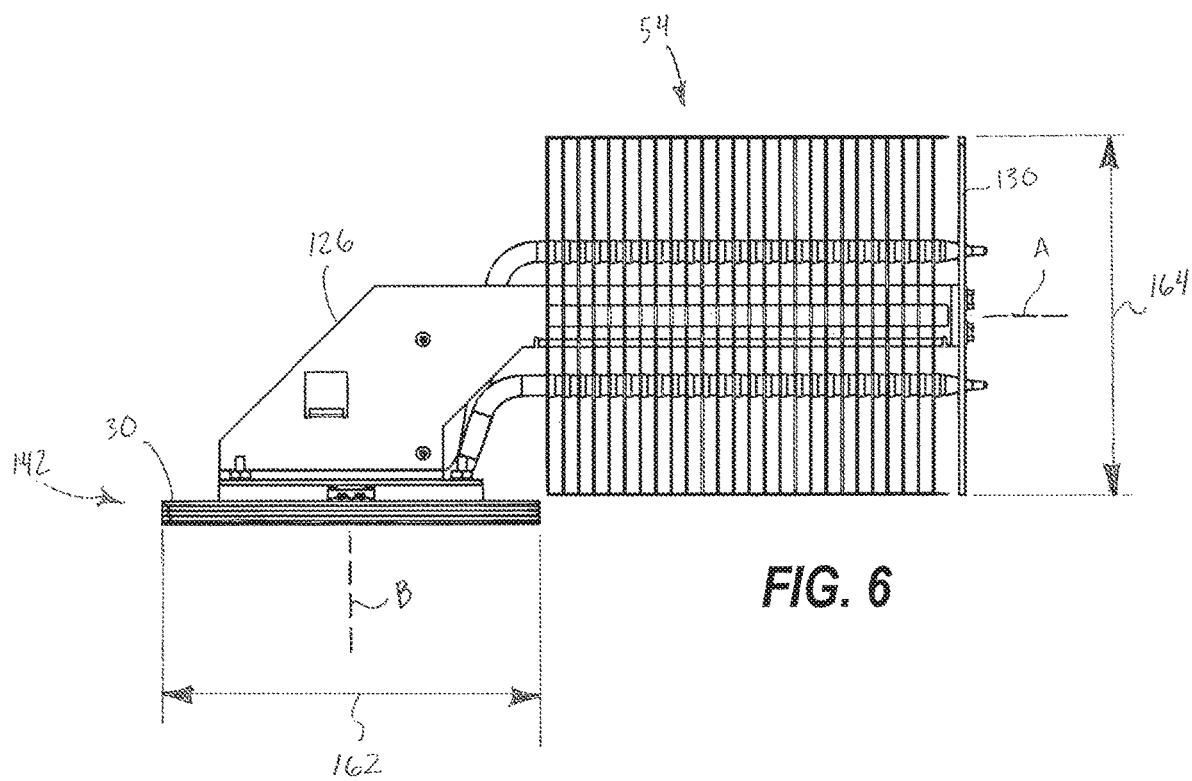
FIG. 6 is a side view of a light engine of the light distribution assembly of FIG. 5.
Figure 7:
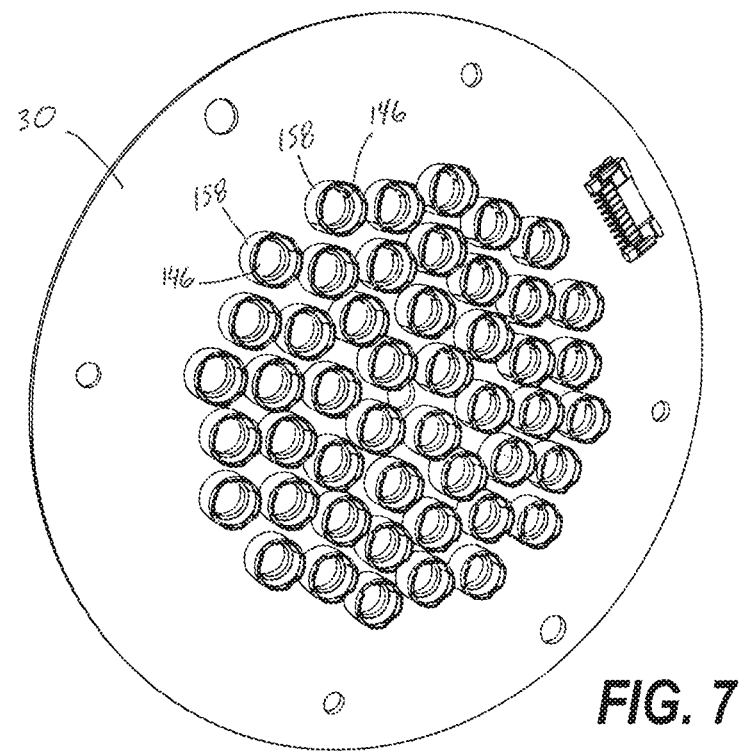
FIG. 7 is a perspective view of a collimator sub-assembly, shown with a collimator retaining plate removed.

With reference to FIG. 5-7, the light distribution assembly 14 further includes a collimator sub-assembly 142 coupled to the circuit board 30. The collimator sub-assembly 142 directs and modifies light emitted by the LED modules along the central axis B of the circuit board 30. The collimator sub-assembly 142 includes a plurality of collimators 146 (FIG. 7) that are arranged to extend from the circuit board 30 in correspondence with the LEDs to efficiently direct light emitted by the LEDs into a narrower beam centered on the central axis B of the circuit board 30. In the illustrated embodiment, the collimator sub-assembly 142 includes forty-eight collimators 146 that are arranged in a generally circularly shaped arrangement pattern. In the illustrated embodiment, the collimators 146 are arranged so as to all be parallel to the central axis B of the circuit board 30. In some embodiments, some or all of the collimators 146 may be non-parallel to one another, and/or some or all of the collimators 146 may be oriented at an angle relative to the central axis B of the circuit board 30. In such embodiments, the light from the LEDs may be directed by the collimators 146 along an axis at an angle (i.e., non-parallel) to the central axis B of the circuit board 30.

The collimator sub-assembly 142 includes collimator support plates 150 (FIG. 6). The collimator support plates 150 have apertures 154 configured to receive collimator holders 158 (FIG. 7), thereby supporting and aligning the collimators 146 in the desired pattern. Each collimator holder supports one of the collimators 146. The collimator support plates 150 are coupled to the circuit board 30 to mechanically hold the collimator holders 158 and the collimators 146 adjacent the LEDs of the circuit board 30. In other embodiments, fewer or more collimators 146 may be included, and the collimators 146 may be arranged in various different patterns and configurations.

Figure 6A:
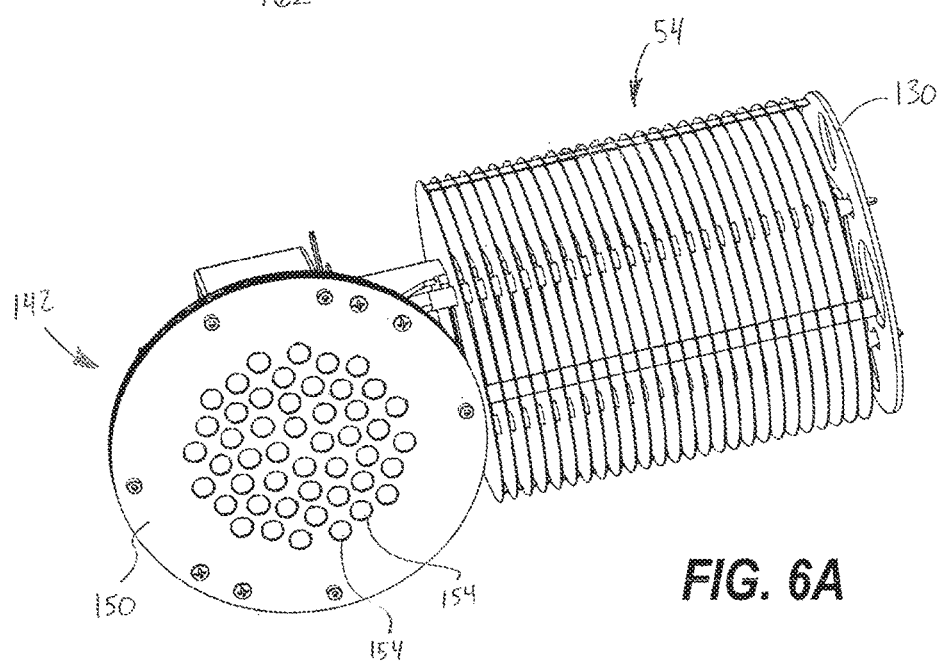
FIG. 6A is a lower perspective view of the light engine of FIG. 6.

As best shown in FIGS. 6-6A, the fin assembly 122, the circuit board 30, the angled brackets 126, and the collimator sub-assembly 142 make up a light engine. The light engine is structured such that each portion of the light engine defines a maximum dimension 162 transverse to a length of the light engine (see FIG. 6). The maximum dimension 162 of the light engine is no greater than the inner dimension 26 of the opening 22, thereby allowing the light engine to be removed through the opening 22 without being disassembled. In some embodiments, the maximum transverse dimension 162 of the light engine is a maximum outer dimension. In the illustrated embodiment, the maximum dimension 162 is a first maximum dimension defined by the circuit board 26 transverse to a first segment of the length of the light engine and the heat sink 54 defines a second maximum dimension 164 transverse to a second segment of the length of the light engine. In the illustrated embodiment, the first maximum dimension 162 is greater than the second maximum dimension 164. In other embodiments, the first and second maximum dimensions 162, 164 may be equal, or the second maximum outer dimension 164 may be greater than the first maximum outer dimension 162. The light engine may be removed through the opening 22 while remaining connected to the electrical wiring harnesses. In the illustrated embodiment, the light engine forms an "L" shape (see FIG. 6) that is generally defined along the central axis A of the heat sink 54 and the central axis B of the circuit board 30. The light engine is pivoted by a user as the light engine is drawn out of the opening 22. In some embodiments, the light engine may be formed in a straight or linear configuration (e.g., see FIGS. 16-17), such that the light engine may be directly removed through the opening 22.

Figure 8:
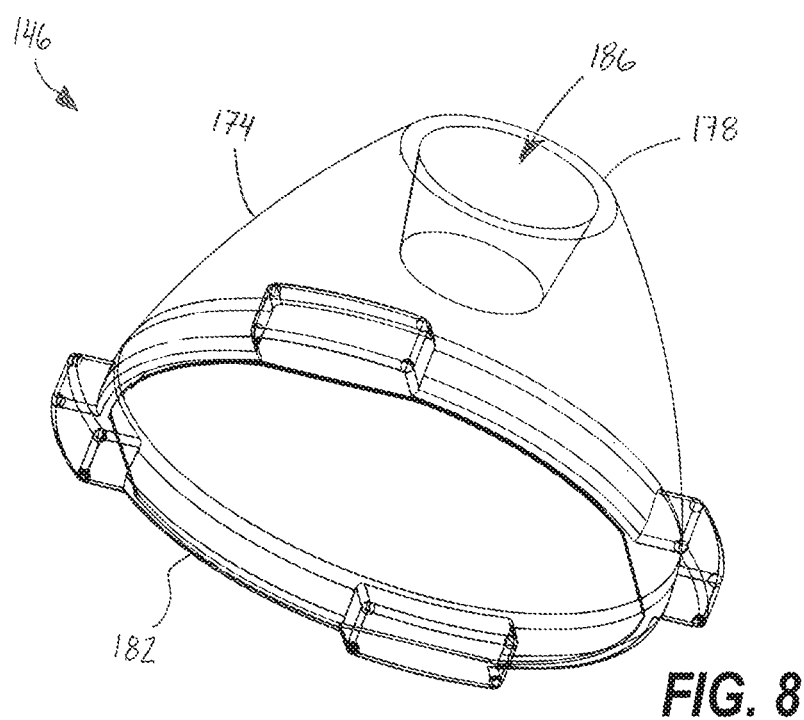
FIG. 8 is a perspective view of a collimator of the collimator sub-assembly of FIG. 7.

As shown in FIG. 8, each collimator 146 is a total internal reflection (TIR) optical lens. Each of the collimators 146 has a translucent body 174 with a first end 178 and a second end 182. A recess 186 is positioned adjacent the first end 178 and receives one of the LED modules. The body 174 has a convex or parabolic exterior shape that tapers outwardly from the first end 178 to the second end 182. A concave arcuate recess is positioned adjacent the second end 182 and extends into the body 174. In the illustrated embodiment, light entering the first end 178 is internally reflected by the body 174 and refracted outwardly by the concave second end 182 to produce a narrower light distribution pattern. Due to the shape of the body 174 and the material of the collimator 146, there are minimal optical losses as light travels through each of the collimators 146 and reflects off the sides of the body 174 before exiting the second end 182.

In some embodiments, light emitted by the LEDs has a ninety vertical degree from nadir (surface normal) pattern and a 360 horizontal degree pattern (i.e., a nearly hemispherical distribution). In some embodiments, the light emitted by the LEDs is modified by the collimator 146 such that light exiting the second end 182 of each of the collimators 146 has an axially symmetric light distribution pattern with a field angle between approximately 15 degrees and 30 degrees from nadir. In some embodiments, the field angle is approximately 22.5 degrees from nadir. That is, light emitted from the second end 182 of each of the collimators 146 forms an illumination distribution pattern having a conical shape, and the outer perimeter of the cone defines an angle of about 22.5 from a central axis of the distribution pattern, and extends 360 degrees about the central axis. Since the illumination distribution pattern of each LED module is modified by each collimator 146, the collimator sub-assembly 142 as a whole emits a modified illumination distribution pattern. The light exiting the collimator sub-assembly 142 has increased centerbeam intensity as the beam is narrowed. As a result, fewer LEDs are required to provide the same centerbeam intensity as provided by LEDs that are not collimated. In the illustrated embodiment, the light from the collimator sub-assembly 142 is centered on the central axis B of the circuit board 30. In embodiments in which the collimators 146 are angled, the light may be centered on an axis at an angle relative to the central axis B of circuit board 30.

Figure 9:
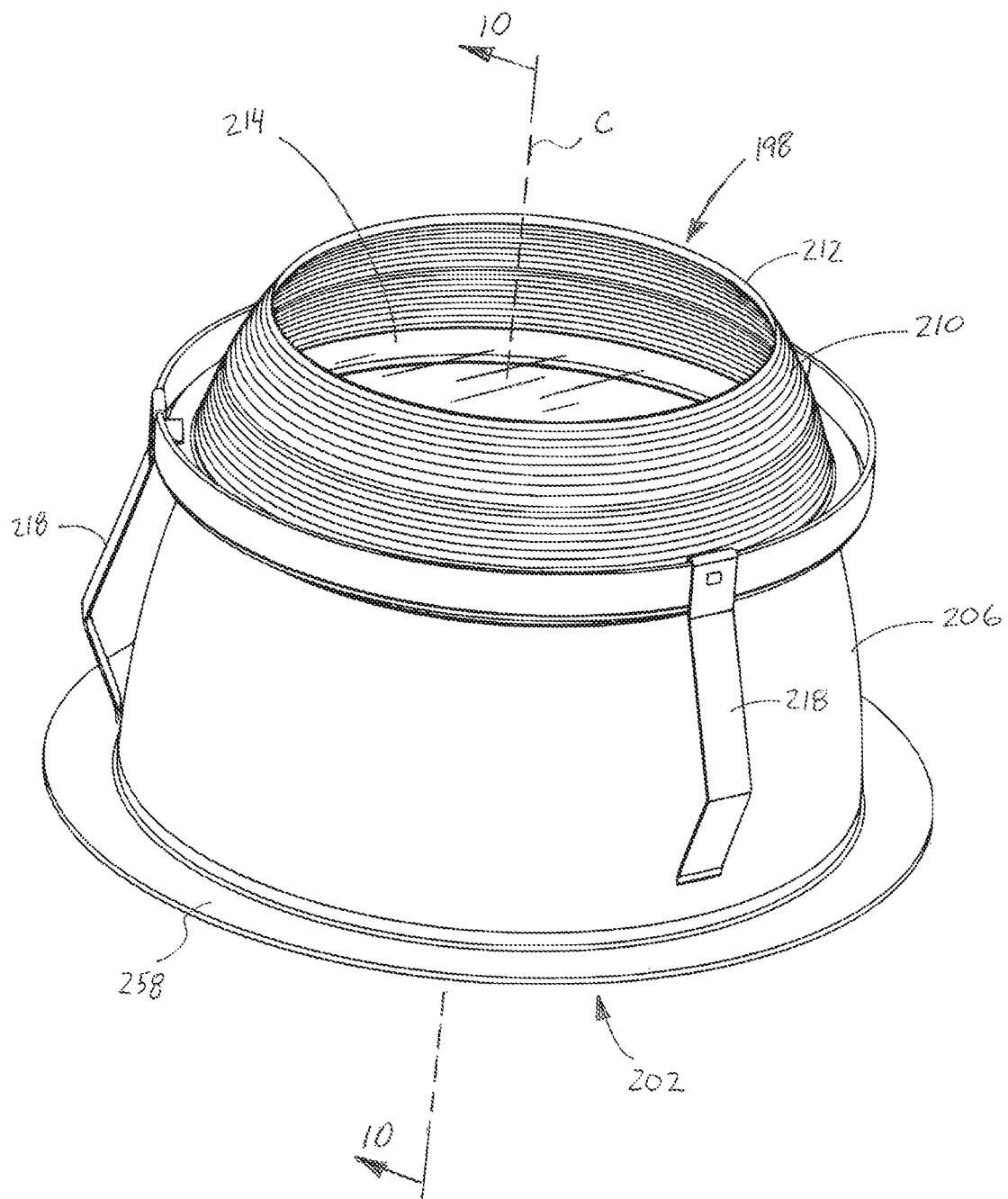
FIG. 9 is a perspective view of a reflector sub-assembly of the light distribution assembly of FIG. 5.
Figure 10:
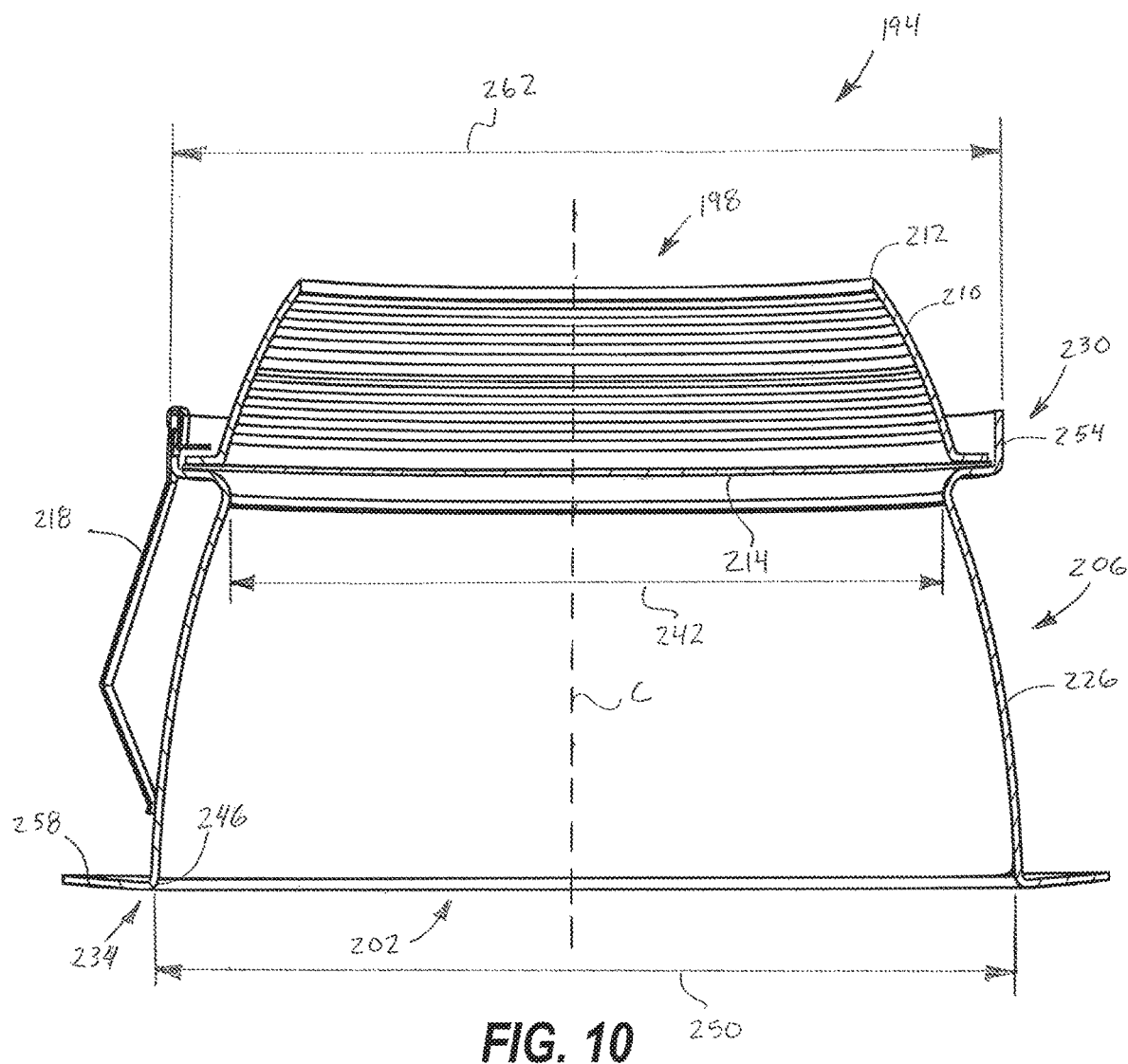
FIG. 10 is a cross-section view of the reflector sub-assembly of FIG. 9 taken along line 10-10 in FIG. 9.

With reference to FIGS. 5 and 9, the light distribution assembly 14 includes a reflector sub-assembly 194 that is positioned adjacent the collimator sub-assembly 142 (FIG. 5) so that light exiting the collimator sub-assembly 142 passes through the reflector sub-assembly 194 by entering an inlet end 198 and exiting an outlet end 202. The reflector sub-assembly 194 includes a first passive reflector or trim member 206, a second passive reflector or spacer member 210, and an active optic or beam controlling optic 214. In the illustrated embodiment, the reflector sub-assembly 194 has a central axis C that the first and second passive reflectors 206, 210 and beam controlling optic 214 are centered on, as shown in FIGS. 9-10. In the illustrated embodiment, the central axis C of the reflector sub-assembly 194 is arranged coaxial with the central axis B of the circuit board 30, as best shown in FIG. 5. The reflector sub-assembly 194 modifies light leaving the collimator sub-assembly 142 via the beam controlling optic 214. The reflector sub-assembly 194 further includes a plurality of knee springs 218 that are coupled to the first reflector 206 and are biased outwardly from the first passive reflector 206. When the reflector sub-assembly 194 is positioned within the opening 22 in the frame 18, the knee springs 218 retain the reflector sub-assembly 194 in the opening 22. The knee springs 218 allow for quick removal of the reflector sub-assembly 142 from the opening 22. A portion of the first passive reflector 206 is flush with the ceiling surface as a trim piece to prevent a direct visual line of sight into the ceiling, thereby blocking visibility of the light fixture 10 and the ceiling plenum.

With reference to FIG. 10, in the illustrated embodiment the first passive reflector 206 includes an arcuate body 226 having an inlet end 230 and an outlet end 234. In alternate embodiments, the body 226 may be rectangular, octagonal, or any other suitable shape that corresponds with the opening 22 in the frame 18. The body 226 tapers outwardly along a curve from the inlet end 230 to the outlet end 234. The inlet end 230 defines an inlet opening 238 having a diameter 242. In some embodiments, the diameter 242 is between approximately 4.50 inches and approximately 5.00 inches. In some embodiments, the diameter 242 is approximately 4.75 inches. The outlet end 234 defines an outlet opening 246 having a diameter 250 that is larger than the inlet opening 238. In some embodiments, the diameter 250 is between approximately 5.50 inches and approximately 6.00 inches. In some embodiments, the diameter 250 is approximately 5.77 inches. The body 226 includes a first flange 254 that extends radially outwardly from the body 226 at the inlet end 230, and a second flange 258 that extends radially outward from the body 226 at the outlet end 234. The first flange 254 has an outer diameter 302 that is sized to fit through the opening 22 in the frame 18. In some embodiments, the outer diameter 302 is a maximum outer dimension of the reflector sub-assembly 194 that is sized to fit through the opening 22 in the frame 18. The second flange 258 does not fit through the opening 22 and acts as trim piece around the opening in the ceiling and the opening 22 in the frame 18 (FIG. 2). In other embodiments, the size of the inlet and outlet openings 238, 246 and the size of the first and second flanges 254, 258 are defined to accommodate the size of the collimator sub-assembly 142, and technical and consumer requirements.

With continued reference to FIGS. 9-10, the beam controlling optic 214 is positioned between the first and second passive reflectors 206, 210 and is supported on the first flange 254 of the first reflector 206 (FIG. 10). The beam controlling optic 214 and the second reflector 210 are coupled to the first reflector 206 by the knee springs 218. Specifically, the knee springs 218 are coupled to a lip extending around the first flange 254, and the ends of the knee springs 218 retain the beam controlling optic 214 and the second reflector 210 between the knee springs 218 and the first flange 254. Alternatively, the beam controlling optic 214 and the second reflector 210 may be coupled to the first reflector 206 by adhesive or fasteners.

The beam controlling optic 214 is spaced from the support plate 150 by the second reflector 210, and is positioned so that light leaving the second end 182 of the collimators 146 passes through the beam controlling optic 214 to modify the distribution of light emitted by the collimator sub-assembly 142 to have a modified light distribution. The beam controlling optic 214 may be a lens material or a film that modifies the light arriving from the collimator sub-assembly 142 in a purposeful direction as to create a desired light distribution pattern such as a desired field angle. In the illustrated embodiment, the beam controlling optic 214 is a thin film that modifies the distribution of light emitted by the collimator sub-assembly 142 by spreading the light, thereby increasing the field angle with minimal optical losses. Thin film optics are generally defined as having very thin structures layered onto various materials with thicknesses on the order often thousandths of an inch or less. In some embodiments, the beam controlling optic 214 may be a thin film configured to modify the light emitted by the collimator sub-assembly 142 to further concentrate and narrow the beam, increasing the center beam intensity. The thin film may include a microstructure to refract the light in a specific manner.

In the illustrated embodiment, the beam controlling optic 214 is oriented so as to lie in a plane generally perpendicular to the central axis C of the reflector sub-assembly 194 (i.e., the direction of the light emitted by the collimator sub-assembly 142), as best shown in FIG. 10. In some embodiments, the beam controlling optic 214' may be oriented in a plane at an angle to the central axis C of the reflector sub-assembly 194 other than perpendicular, as shown in the alternate embodiment of FIG. 10A. In such embodiments, the beam controlling optic 214 modifies the light from the collimator sub-assembly 142 along the central axis B of the circuit board 30 so as to modify a center of the light to be angled relative to the central axis C of the reflector sub-assembly 194. The beam controlling optic 214' may be supported by tabs or ledges (not shown) within the first reflector 206', or alternatively within the second reflector 210'. In some embodiments, the beam controlling optic 214 may have portions angled relative to the central axis C of the reflector sub-assembly 194 to similarly modify the light leaving the collimator sub-assembly 142. In such embodiments, the beam controlling optic 214 may be supported by the second reflector 214 similarly as shown in FIG. 10.

In some embodiments, the beam controlling optic 214 is a diffuser lens that modifies the light by diffusing or softening the light emitted by the collimator sub-assembly 142 to create "soft" light. In some embodiments, the beam controlling optic 214 may modify the color of the light exiting the collimator sub-assembly 142. In some embodiments, the beam controlling optic 214 modifies the light exiting the collimator sub-assembly 142 to create a wall wash or accent pattern on the surface illuminated by the emitted light (e.g., a wall or floor). In some embodiments, the beam controlling optic 214 may be a pillow lens that modifies the light to have an off-axis light distribution. In other embodiments, the beam controlling optic 214 may provide an elliptical pattern or another pattern on an illuminated surface. In some embodiments, the light distribution assembly 14 may omit the beam controlling optic 214 entirely. In other embodiments, additional reflectors or refractive material (e.g., plastic or glass lenses, TIR optics) may be positioned within or in front of the first passive reflector 206 to further modify the output light.

A second reflector sub-assembly (not shown) may be provided that is nearly identical to the first reflector sub-assembly 194 but, for example, has a different beam controlling optic 214. The reflector sub-assembly can be matched with the light engine (e.g., during installation) to readily provide a different modified light distribution. In a similar manner, the reflector sub-assembly 194 may be removed from the opening 22 and swapped with a different reflector sub-assembly to quickly and easily change the beam controlling optic 214 to provide a different light distribution pattern. Among other things, this interchangeability allows the beam controlling optic 214 to be quickly and easily replaced if damaged. In some embodiments, the beam controlling optic of the second reflector sub-assembly may be oriented at a different angle relative to the central axis C of the reflector sub-assembly, such as in the embodiment shown in FIG. 10A. In such embodiments, the beam controlling optic of the second reflector sub-assembly may be similar to or different from the beam controlling optic 214 of the first reflector sub-assembly 194.

To assemble the collimator sub-assembly 142, the collimators 146 are inserted into the collimator holders 158, which are then aligned with corresponding apertures 154 in the support plate 150. The support plate 150 is aligned on the circuit board 30 such that the collimators 146 are aligned with the LED modules on the circuit board 30. Accordingly, corresponding LED modules are positioned within the recess 186 of each of the first ends 178 of the collimators 146. The support plate 150 is then coupled to the circuit board 30 to hold the collimators 146, and support plates 150 in place on the circuit board 30. In some embodiments, the collimators 146 or the collimator holders 158 may be adhered to circuit board 30 via adhesive to secure the collimators 146 in place on the circuit board 30. Alternatively, the collimators 146 or the collimator holders 158 may each have clips or fasteners to secure the collimators 146 to the circuit board 30. The collimator sub-assembly 142 and circuit board 30 may then be connected to the brackets 126 supporting the heat sink.

In order to install the light fixture 10, the support frame 18 supporting the power supply assembly 58 and the junction box 62 is positioned within the ceiling space so that a hole cut in the ceiling corresponds with the opening 22 in the support frame 18. The support frame 18 is then anchored to support beams (not shown) or other structure within the ceiling. The circuit board 30 is coupled to the support members 34 that are pivotably connected to the support frame 18, thereby aligning the collimator sub-assembly 142 and the circuit board 30 with the opening 22 in the support frame 18. The circuit board 30 is then electrically connected to the drivers 70 via the second wiring harness 98 to provide and control power to the LED modules. The third wiring harness 102 is also connected to the safety connector cover 46. The reflector sub-assembly 194 is then inserted through the hole in the ceiling and the opening 22 in the support frame 18. As the reflector sub-assembly 194 is inserted into the opening 22 the knee springs 218 are urged inward by the support frame 18 around the opening 22. Once the reflector sub-assembly 194 is fully received in the opening 22 the knee springs 218 are biased outward to couple the reflector sub-assembly 194 within the opening 22 in the support frame 18.

In operation of the light fixture 10, the drivers 70 supply power to the LED modules. When power is supplied to the LED modules, the LEDs each emit light in a hemispherical light distribution pattern. The light reflects and refracts within each of the corresponding collimators 146 such that the light is directed out of the second end 182 of each collimator 146. Due to the shape, material, and dimensions of the collimators 146, the light exits the second end 182 of each collimator 146 with a narrowed, more concentrated light distribution pattern than if the collimator sub-assembly 142 were not present, without significant optical losses. In the illustrated embodiment the narrowed light distribution has a half width field angle of approximately 22.5 degrees. The light exiting each collimator 146 merges to form a single narrow beam that exits the collimator sub-assembly 142 with the same field angle as each of the individual collimators 146. The light then passes through the beam controlling optic 214 within the reflector sub-assembly 194 and is modified into the desired distribution pattern, which in the illustrated embodiment is a wide distribution pattern that exits the first passive reflector 206 to illuminate a surface opposite the light fixture 10. Because the beam controlling optic 214 is also highly efficient at modifying the narrow beam received from the collimator sub-assembly 142, the light fixture 10 is able to take a nearly hemispherical illumination distribution pattern from the LEDs and modify the light to efficiently create any desired light distribution pattern through either the collimator sub-assembly 142 or the beam controlling optic 214.

Figure 10A:
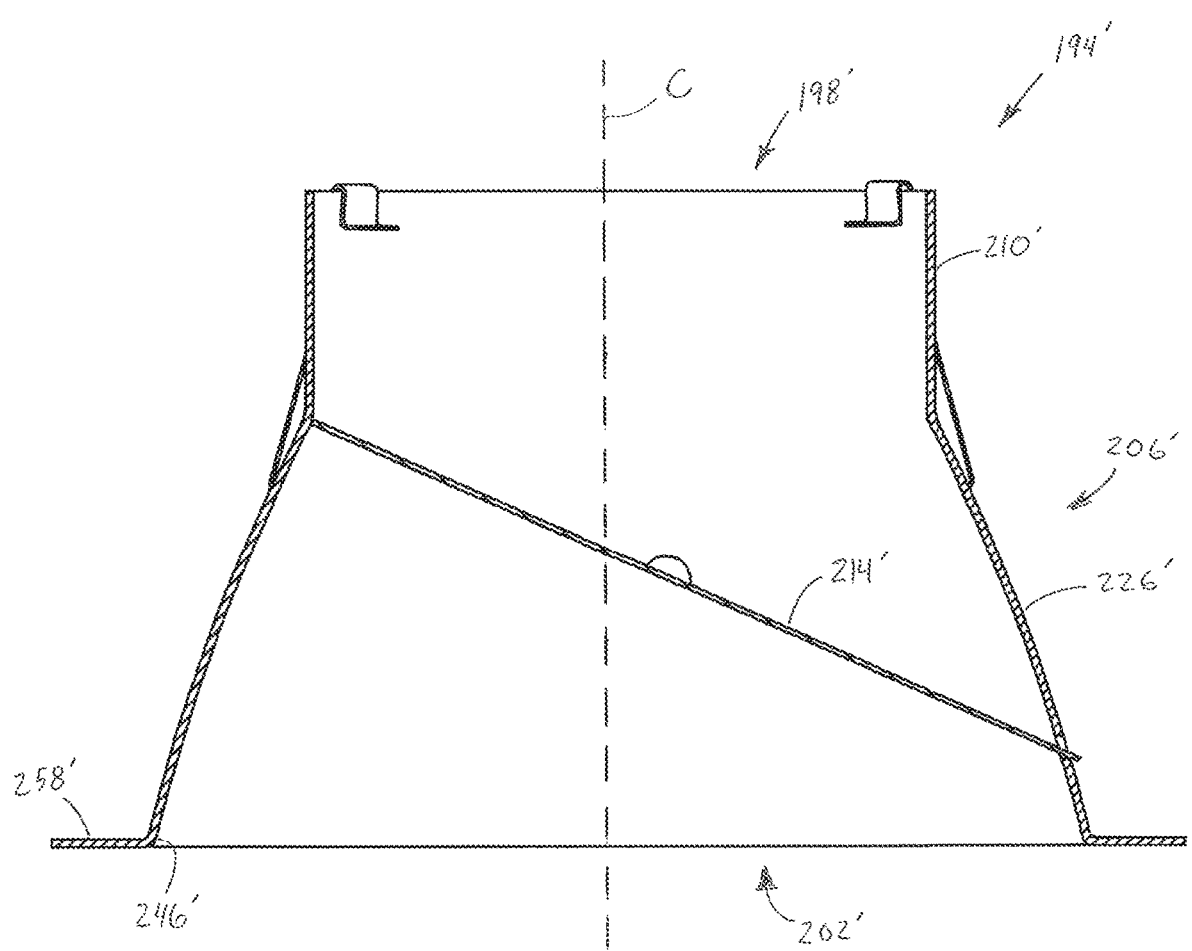
FIG. 10A is a cross-section view of a reflector sub-assembly according to another embodiment.

In the illustrated embodiment, the light engine (i.e., the circuit board 30 and the collimator sub-assembly 142) is supported by the support members 34 such that the central axis B of the circuit board 30 is parallel and coaxial with an axis perpendicular to the plane of the ceiling (e.g., a central axis of the opening 22), as best shown in FIG. 1. As such, light leaving the collimator sub-assembly 142 is generally perpendicular to the plane of the ceiling. In some embodiments, the light engine (i.e., the circuit board 30 and the collimator sub-assembly 142) may be supported by the support members 34 such that the central axis B of the circuit board 30 is at an angle to the axis perpendicular to the plane of the ceiling. As such, light leaving the collimator sub-assembly 142 is directed at an angle relative to the axis perpendicular to the plane of the ceiling. In such embodiments, light leaving the collimator sub-assembly 142 may have a "wall wash" distribution pattern. In some embodiments, the angle that the central axis B is oriented at relative to the central axis of the opening 22 may be adjustable to adjust the angle at which light is directed. In some embodiments, the beam controlling optic 214 may be supported at an angle relative to the central axis of the opening 22 (i.e., non-parallel with the plane of the ceiling), as shown in FIG. 10A, to change the angle that light is directed at. In such embodiments, light leaving the collimator sub-assembly 142 may have a center perpendicular to the plane of the ceiling, before passing through the beam controlling optic 214' and being directed such that the light leaving the reflector sub-assembly 194 is at an angle relative to the axis perpendicular to the plane of the ceiling.

The drivers 70 control the LEDs on the circuit board 30, including the power to the LEDs. In one embodiment, the LED modules are independently controlled by the drivers 70. For example, each of the LED modules may be turned off/on independent of the other LED modules, or the intensity may be independently specified for the light output of each of the LED modules. In one embodiment, a group of the LED modules may be controlled by each driver 70. For example, an inner group of LED modules may be controlled independent of an outer group of LED modules by separate drivers 70. This includes controlling power to the outer group of LED modules independent of the inner group of LED modules, and/or controlling the intensity of light emitted by the inner group of LED modules relative to the outer group of LED modules. Each of the drivers 70 may be any suitable LED driver, including a constant DC current output driver or a constant voltage output driver. In one embodiment, the drivers 70 have dimming capability. In one embodiment, the drivers 70 may provide independent dimming capability to each of the LED modules. The independent control of the LED modules, or group of LED modules, allows an operator to optimize performance of the light fixture 10 depending on environmental conditions, such as ceiling height. In one embodiment, the drivers 70 control the color of the light emitted by the LEDs, and may in another embodiment independently control the color of the light emitted by each of the LED modules. In another alternate embodiment, each of the individual LEDs 98 of each of the LED modules may be separately powered and controlled by separate independent drivers on different circuits, to allow for independent control of intensity, color, or toggling of the LEDs within the LED modules.

Figure 11:
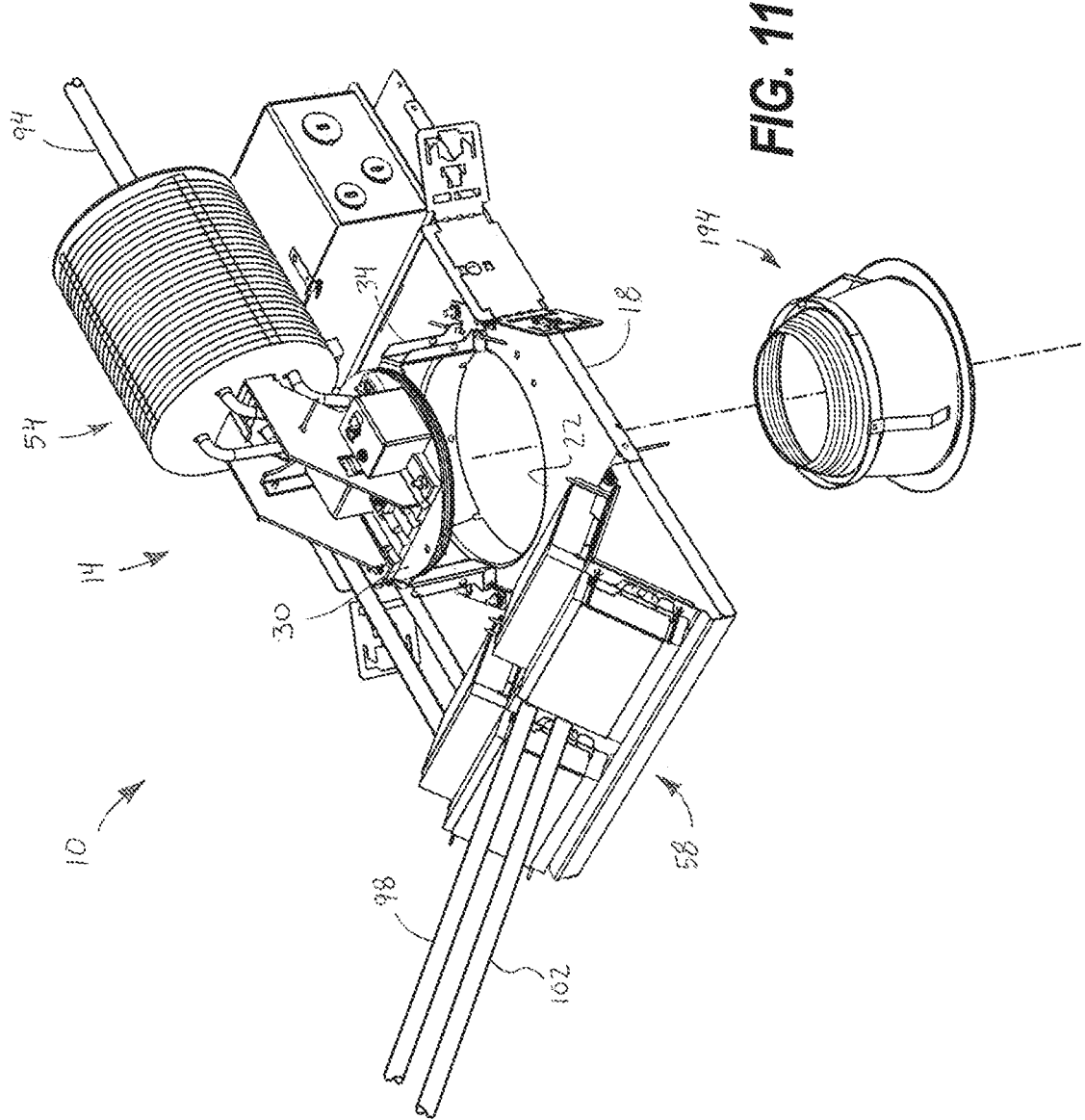
FIG. 11 is a partial exploded view of the light fixture of FIG. 1, with the reflector sub-assembly removed from an opening in a frame of the light fixture.

In order to remove various components for examination, repair, and/or replacement, an operator may simply remove the reflector sub-assembly 194 from the opening 22 of the frame 18. The knee springs 218 are urged inward by the edge of the opening 22 to release the reflector sub-assembly 194 and allow it to be removed from the opening 22, as shown in FIG. 11. Once the reflector sub-assembly 194 is removed, the operator can then reach through the opening 22 in the frame 18 and remove or loosen the fasteners connecting the light engine to the pivoting support members 34 to disconnect the light engine from the support members 34. Then, the operator can disconnect the first wiring harness 94 from the junction box 62. The second and third wiring harnesses 98, 102 may then also be disconnected from the circuit board 30 (i.e., the top of the light engine) by removing the safety connector cover 46 and the circuit board connector cover 50. In some embodiments, once the reflector sub-assembly 194 is removed, the operator may insert a second reflector sub-assembly similar to the first reflector sub-assembly 194, but, for example, having a different beam controlling optic in order to modify the light distribution.

Figure 12:
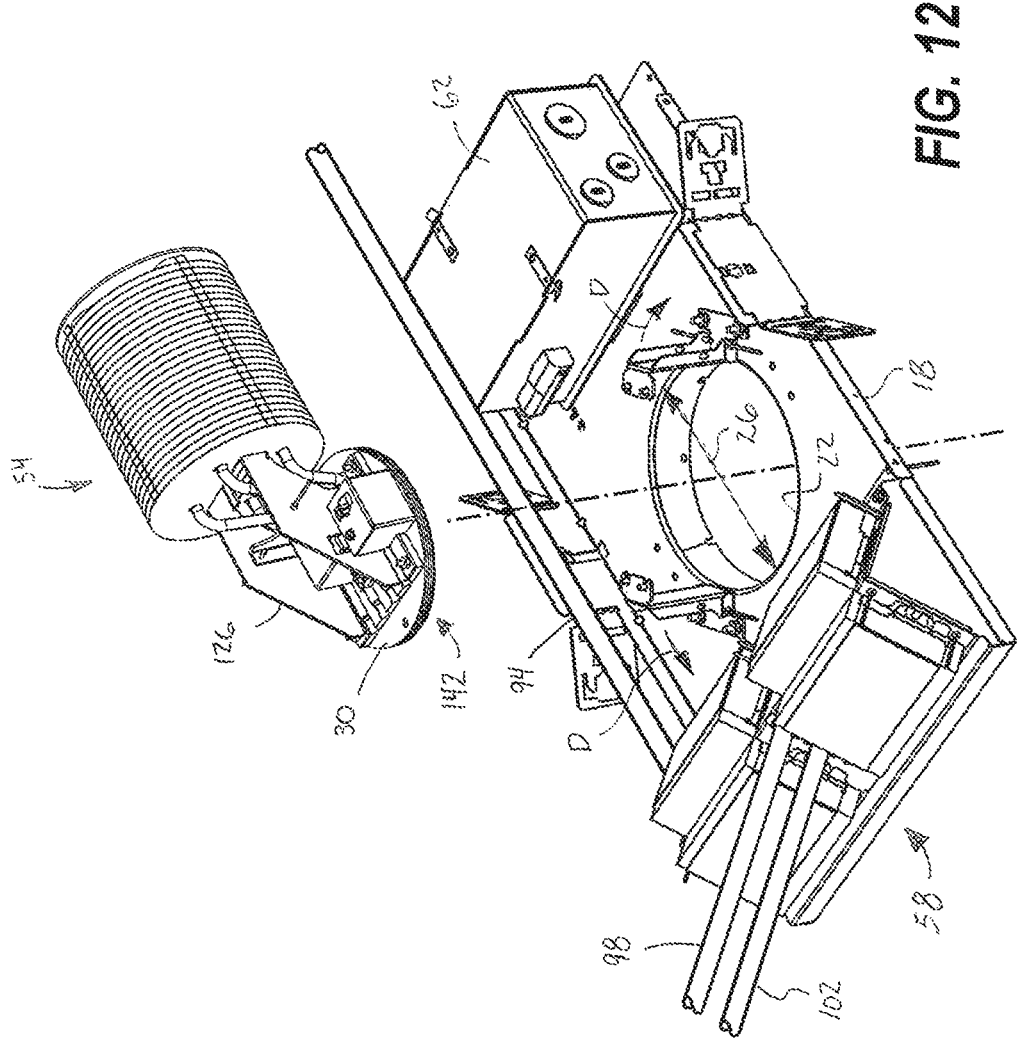
FIG. 12 is a partial exploded view of the light fixture of FIG. 1, with the reflector sub-assembly removed and with the light engine of the light distribution assembly disconnected from the frame.

Referring to FIG. 12, the pivoting support members 34 may then be pivoted outwardly away from the opening 22 (i.e., in the direction of arrows D) so that the circuit board 30, the heat sink 54, and the collimator sub-assembly 142 (i.e., the light engine) may be removed as a single unit through the opening 22. Due to the maximum dimension 162 of the light engine transverse to the length of the light engine being less than the diameter (i.e., inner dimension 26) of the opening 22, the light engine may be fished through the opening 22. The first wiring harness 94 may then also be disconnected from the junction box 62 and/or the power supply enclosure 66. Alternatively, the first wiring harness 94 may remain connected while the components are drawn through the opening 22 and inspected.

Figure 13:
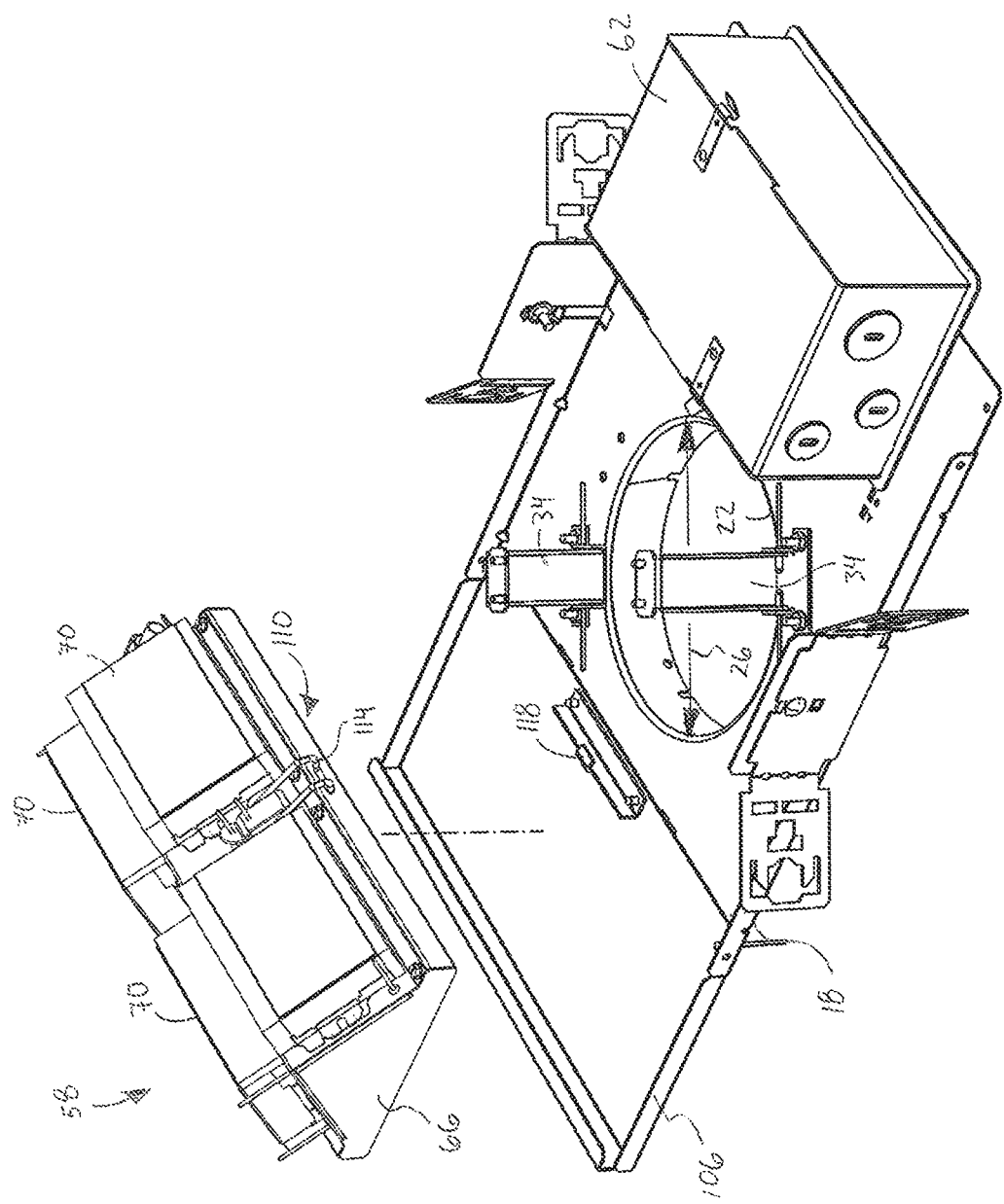
FIG. 13 is a partial exploded view of the light fixture of FIG. 1, the light distribution assembly removed, and with the power supply assembly disconnected from the frame.
Figure 14B:
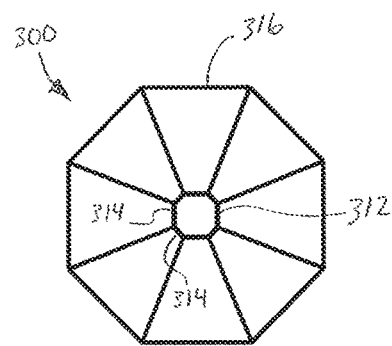
FIG. 14B is an end view of the collimator of FIG. 14A.
Figure 14C:
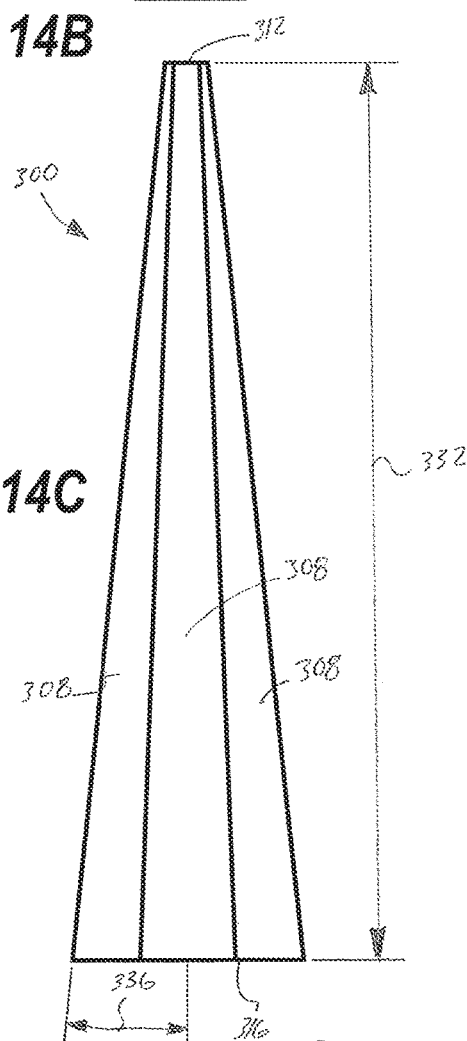
FIG. 14C is a side elevation view of the collimator of FIG. 14A.
Figure 14A:
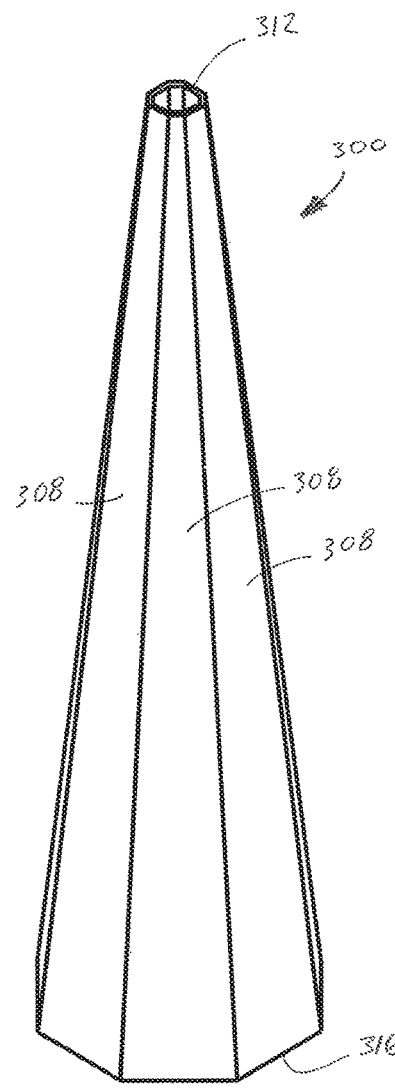
FIG. 14A is a perspective view of a collimator according to another embodiment.
Figure 14D:
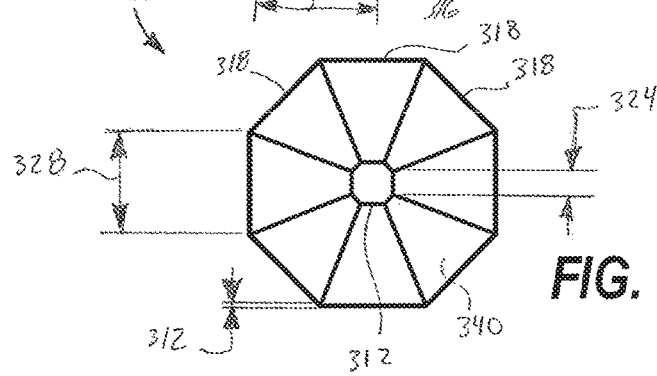
FIG. 14D is a second end view of the collimator of FIG. 14A.

As shown in FIG. 13, the latch assembly 110 on the power supply enclosure 66 may be released so that the power supply assembly 58 may be removed from the tray 106. Once removed from the tray 106, the power supply assembly 58 is removable through the opening 22. Due to the inclined walls 74, the maximum dimension 90 of the power supply assembly 58 is less than the diameter (i.e., the inner dimension 26) of the opening 22, thereby allowing the power supply assembly 58 to fit through the opening 22. In the present embodiment, the power supply assembly 58 has its own independent power supply enclosure 66 that also supports the drivers 70 and is separate and spaced from the junction box 62 to facilitate removing the power supply assembly 58 including the drivers 70 and corresponding wiring from the light fixture 10 for examination, repairs, and/or replacement.

Alternatively, the second and third wiring harnesses 98, 102 may be left connected to the power supply assembly 58 so that the power supply assembly 58 and the light engine may be removed from the opening 22 while still connected together by the second and third wiring harnesses 98, 102, in which the power supply assembly 58 is removed first. Additionally, the power supply assembly 58 may be removed from the opening 22 without removing the light engine. Instead after the circuit board 30 is disconnected from the support members 34, the light engine is set aside, and then the second and third wiring harnesses 98, 102 are disconnected from the power supply assembly 58 before or after the power supply 58 is disconnected from the tray 106 via the latch assembly 110. The power supply assembly 58 may then be removed through the opening 22 to be serviced. The light engine may be left in the ceiling plenum until the power supply assembly 58 is returned and reconnected with the light engine.

FIGS. 14A-14D illustrate a reflector-type collimator or reflector 300 that may be used in place of the collimator 146 of FIG. 8. The reflector 300 includes a thin walled body 304 having eight walls 308 that extend between an open inlet end 312 and an open outlet end 316. In some embodiments, the walls 308 have a thickness 320 between approximately 0.02 inches and approximately 0.03 inches. In some embodiments, the thickness 320 is approximately 0.0239 inches. The thin walled body 304 tapers outwardly from the inlet end 312 to the outlet end 316 such that the thin walled body 304 has a truncated pyramidal shape, or a frustum shape. The reflector 300 extends along an axis parallel to the central axis B of the circuit board 30, and a transverse cross section taken at any point along the length of the thin walled body 304 defines an octagon. In some embodiments, the reflector 300 may be angled relative to the central axis B for off-axis directional lighting.

The walls 308 at the inlet end 312 define an octagon having sides 314. Each side 314 has a length 324. In some embodiments, the length 324 is between approximately 0.3 inches and approximately 0.5 inches. In some embodiments, the length 324 is approximately 0.376 inches. The walls 308 at the outlet end 316 define an octagon having sides 318, each having a length 328. The reflector 300 defines a perpendicular distance H (i.e., height) between the inlet end 312 and the outlet end 316. In some embodiments, the height 332 is between approximately 2.5 inches and approximately 3.5 inches. In some embodiments, the height 332 is approximately 3.0 inches. Each wall 308 of the reflector 300 tapers outwardly from the inlet end 312 to the outlet end 316 at a taper angle 336. In some embodiments, the taper angle 336 is between approximately 5.0 degrees and approximately 6.5 degrees from vertical. In some embodiments, the taper angle 336 is approximately 5.75 degrees from vertical. In other embodiments, the thickness 320, the length 324, the length 328, the height 332, and/or the taper angle 336 of the reflectors 300 may have other dimensions, and may be dimensioned to provide desired light distribution patterns.

The inlet end 312 of each reflector 300 receives one of the LED modules. In some embodiments, the LED modules may include any number of LEDs that fit within the inlet end 312 of the reflector 300. The LED modules may be arranged on the circuit board 30 such that the outlet ends 316 of the reflectors 300 abut or have a small gap. By having corresponding sides 318 of the outlet ends 316 of the reflectors 300 abutting or nearly abutting one another, there is minimal spacing between adjacent reflectors 300, thereby providing a compact assembly such that all outlet ends 316 of the reflectors 300 fit within an inlet end 212 (FIG. 10) of the second passive reflector 210 of the reflector sub-assembly 194. Although each reflector 300 in the illustrated embodiment is a truncated octagonal pyramid, in other embodiments each reflector 300 may have a truncated pyramidal shape having a triangular base, a square base, a pentagonal base, a hexagonal base, an octagonal base, or any combination of these shapes that may allow the outlet ends 316 of each of the reflectors 300 to nest. In other embodiments, each reflector 300 may have a circular base, such as described above with respect to the parabolic collimators.

The thin walled body 304 has an interior surface 340 (FIG. 15) having a high reflectance. In some embodiments, the reflectance is at least approximately 90%; in some embodiments, the reflectance is at least approximately 98%. The interior surface 340 may include a layer of specular film, such as Specular Film D50F material, in order to achieve this reflectance. The specular film has a highly specular and uniform surface with a high reflectance value for every wavelength of visible light. In some embodiments, the reflectance value is at least approximately 98%, and in some embodiments at least approximately 98.5%. The specular film also has high UV and high intensity LED irradiance stability allowing for increased service life of the specular film when used in high intensity LED light engines. The specular film is made of a nonconductive 100% polymeric material that may be cut to any desired shape to cover the interior surface 340. In some embodiments, the specular film may have a protective coating to provide abrasion resistance to allow for cleaning of the specular film without scratching the reflective surface. In some embodiments, the specular film may also have a removable protective mask over the protective coating that may be removed before or after being adhered to the interior surface 340. In some embodiments, instead of a specular film, the interior surface 340 of the thin walled body 304 may itself have a high reflectance similar to the specular film.

Accordingly, each of the reflectors 300 directs light emitted by the corresponding LED module starting at the inlet end 312 along the interior surface 340 and exiting the outlet end 316 of the reflector 300. Due to the properties of the interior surface 340, there are minimal optical losses as light travels through each of the reflectors 300 and reflects off the interior surface 340. Light emitted by the LEDs has a ninety vertical degree from nadir (surface normal) pattern and 360 horizontal degree pattern (i.e., a nearly hemispherical distribution). In some embodiments, the light emitted by the LEDs is modified by the reflector 300 such that light exiting the outlet end 316 of each of the reflectors 300 has an axially symmetric light distribution pattern with a field angle between approximately 15 degrees and 30 degrees from nadir. In some embodiments, the field angle is approximately 22.5 degrees from nadir. That is, light emitted from the outlet end 316 of each of the reflectors 300 forms an illumination distribution pattern having a conical shape, and the outer perimeter of the cone defines an angle of about 22.5 degrees from a central axis of the distribution pattern, and extends 360 degrees about the central axis. Since the illumination distribution pattern of each LED module is modified by each reflector 300, the collimator sub-assembly 142 as a whole emits a modified illumination distribution pattern. The light exiting the collimator sub-assembly 142 also has increased centerbeam intensity as the beam is narrowed. As a result, fewer LEDs are required to provide the same centerbeam intensity as provided by LEDs that are not collimated.

Figure 15:
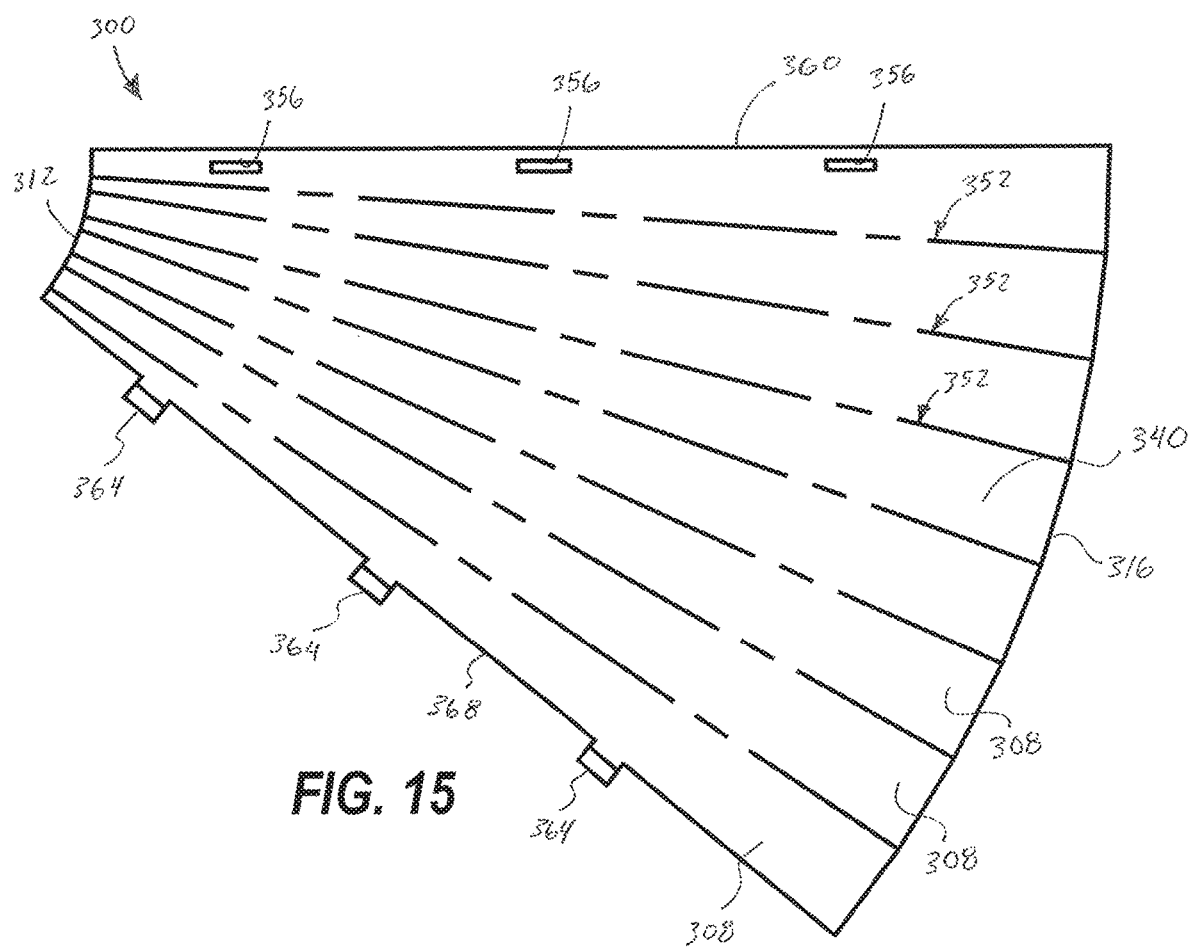
FIG. 15 is a plan view of the collimator of FIG. 14A in an unfolded, unassembled state.

With reference to FIG. 15, each reflector 300 may be formed from a rigid sheet made out of a rigid plastic or a metal material. The specular film is applied to a surface corresponding to the interior surface 340 of the reflector 300. In the illustrated embodiment, the rigid sheet is cut or formed to have a tapered or fan shape, and the sheet is scored along folding lines 352 in order to define sections that correspond to each of the walls 308 of the thin walled body 304. Slots 356 may be cut out or formed along an edge on one side 360 of the rigid sheet and corresponding tabs 364 may be cut out or formed along an edge on an opposite side 368 of the rigid sheet. The rigid sheet is then folded along the scored folding lines 352 inward such that the interior surface 340 faces inwardly. The tabs 364 are then inserted and interlocked with the slots 356 to secure the reflector 300 in its final pyramidal shape. In some embodiments, the sides 360, 368 are secured together by adhesive, fasteners, or the like to form each of the reflectors 300. In alternate embodiments, the rigid sheet is cut and scored to form more or less than eight sections corresponding to different pyramidal shapes. A support plate (not shown) that supports each of the reflectors 300 within corresponding support plate openings may include a notch adjacent each of the support plate openings to accommodate for the tabs 364 of each of the reflectors 300 when the reflectors 300 are received by the support plate openings. In some embodiments, some or all of the reflectors 300 may be mounted on a common assembly (e.g., via the support plate) to allow the reflectors 300 to be removably coupled with the light engine as a unit (e.g., the assembly including the reflectors 300 may be removably coupled to the circuit board 30 via fasteners). In such embodiments, the common assembly including the reflectors 300 may be disconnected from the light engine and removed through the opening 22 for replacement or repair.

Figure 16:
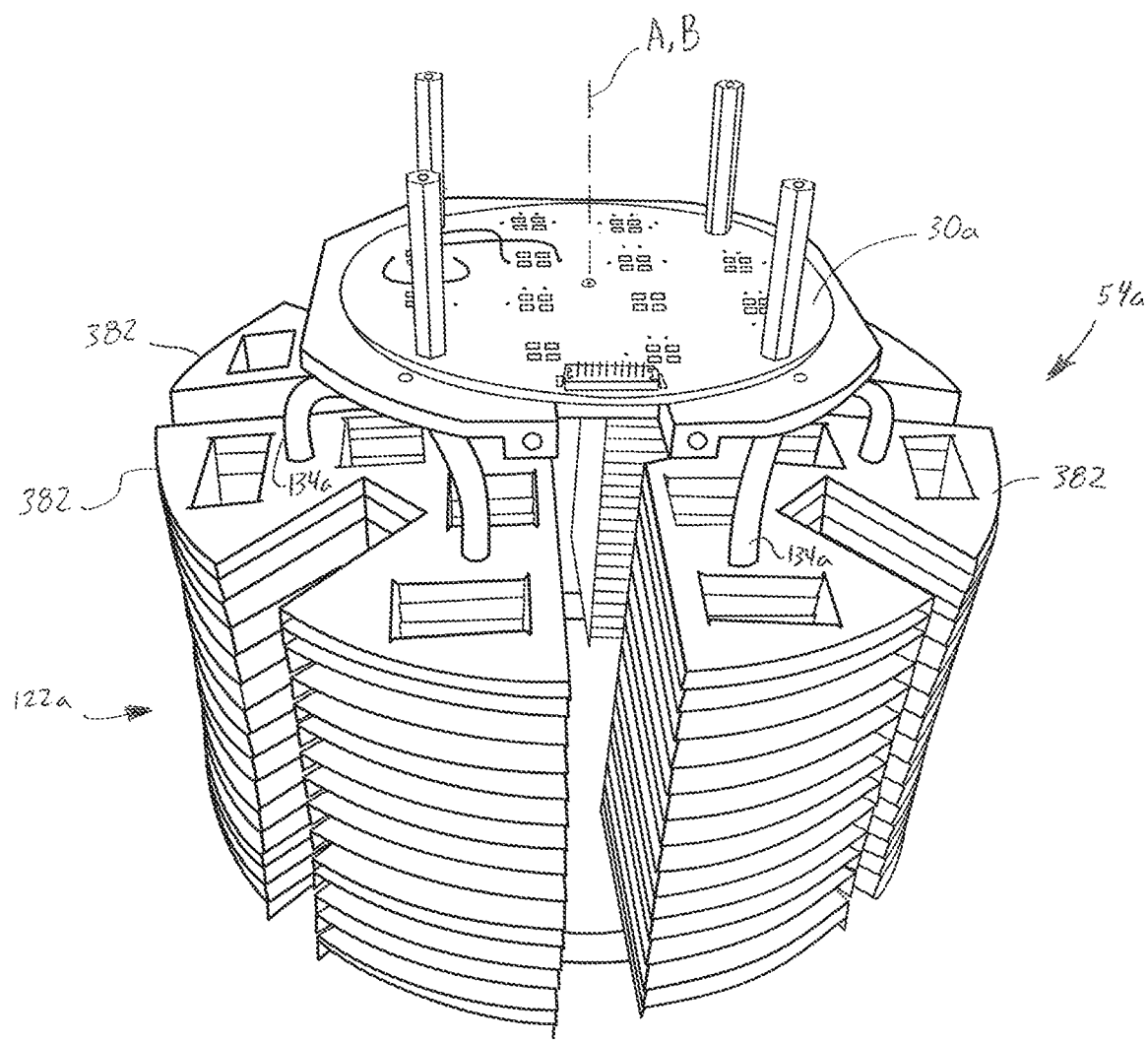
FIG. 16 is a perspective view of a heat sink and circuit board according to another embodiment.
Figure 17:
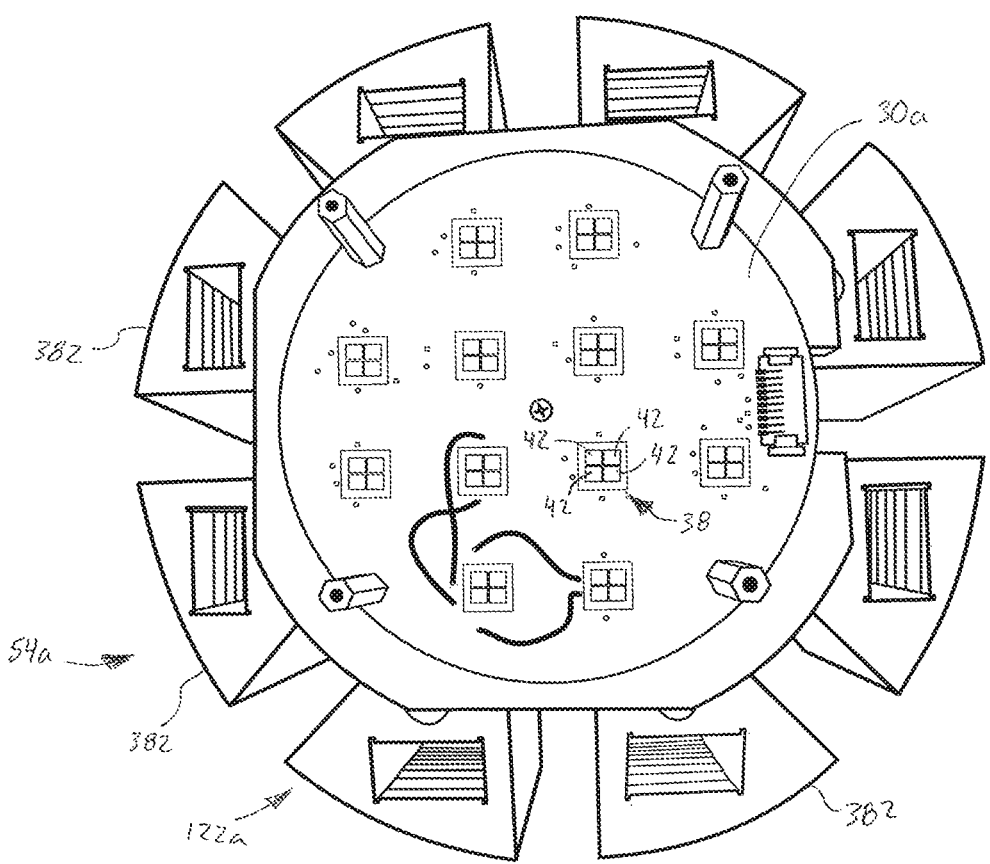
FIG. 17 is a top view of the heat sink and circuit board of FIG. 16.

FIGS. 16-17 illustrate a circuit board 30a mounted to a heat sink 54a in accordance with another embodiment. Like components and features are identified with like reference numerals plus the letter "a" and will not be described again in detail. The circuit board 30a may support the collimator sub-assembly 142 of FIGS. 6-7. The heat sink 54a of FIGS. 16-17 may replace the heat sink 54 of FIGS. 1-5. The heat sink 54a of FIGS. 16-17 is arranged such that a fin assembly 122a of the heat sink 54a has a central longitudinal axis A that extends parallel or coaxial with a central axis B of the circuit board 30a. This configuration allows for the fin assembly 122a to be fitted inside a narrow cylinder unit. The fin assembly 122a includes independent portions 382 that are equally radially spaced 360 degrees about the central longitudinal axis A of the fin assembly 122a. The fin assembly 122a of FIGS. 16-17 includes eight portions 382, although there may be fewer or more portions 382 of the fin assembly 122a. The manner of operation of the heat sink 54a of FIG. 16-17, is otherwise identical to that described above in connection with the light fixture 10 of FIGS. 1-7.

Although the light fixture is illustrated as a recessed light fixture, the light distribution assembly may be any other type of light fixture.

In general, the light fixture 10 includes a collimator sub-assembly 142 having a plurality of collimators 146 and a beam controlling optic 214 that cooperate to provide a compact light fixture 10 that efficiently modifies light emitted by a plurality of LEDs 42 into a desired light distribution pattern.

Although certain aspects have been described in detail with respect to certain embodiments, variations and modifications exist within the scope and spirit of one or more independent aspects as described.

What is claimed is:

1. A light fixture comprising:
   a frame supported in a recessed manner relative to a surface, the frame including an opening and supporting a circuit board adjacent the opening;
   a plurality of light-emitting elements supported on the circuit board;
   a plurality of collimators positioned adjacent the light emitting elements, each of the collimators including a first end positioned adjacent an associated one of the light-emitting elements, each of the collimators further including an inner wall that is curved to internally reflect the light output of the associated light-emitting element and focus the light through a second end opposite the first end; and
   a reflector assembly including a first reflector, a second reflector removably coupled to the first reflector, and a beam controlling optic positioned between the first reflector and the second reflector, the beam controlling optic modifying a light output from the second ends of the plurality of collimators to provide a light distribution, the beam controlling optic being a thin film including a microstructure,
   a power supply assembly being independent and separate from an electrical junction box and removably supported by the frame, the power supply assembly having a length and a maximum dimension transverse to the length, the maximum dimension of the power supply assembly being less than the inner dimension of the opening to allow the power supply assembly to be removed through the opening in the frame, the power supply assembly including,
   an enclosure having a base, a first inclined wall, and a second inclined wall, the first inclined wall and second inclined wall being joined along an apex edge, the apex edge oriented parallel to the length of the power supply assembly to form a prism shape, and
   a first driver coupled to the first inclined wall and a second driver coupled to the second inclined wall.

2. The light fixture of claim 1, wherein the first reflector and the second reflector are connected by a knee spring.

3. The light fixture of claim 1, wherein each of the collimators is supported independent of the other collimators.

4. The light fixture of claim 1, further comprising a knee spring coupled to the reflector to maintain the reflector within the opening in the frame.

5. The light fixture of claim 1, wherein the reflector assembly can be uncoupled from the collimators in a toolless manner and replaced with a second reflector assembly supporting a second beam controlling optic.

6. The light fixtures of claim 5, wherein the light distribution is a first light distribution having a first distribution angle, wherein when the second beam controlling optic is positioned adjacent the second ends of the plurality of collimators, the second beam controlling optic provides a second light distribution having a second distribution angle that is different from the first distribution angle.

7. The light fixture of claim 1, wherein each collimator defines a collimator axis extending between the first end and the second end, the collimator axes of the plurality of collimators oriented parallel to one another.

8. The light fixture of claim 7, further comprising a heat sink for dissipating heat generated by the light-emitting elements, the heat sink extending along a heat sink axis oriented at an angle relative to the collimator axes.

9. The light fixture of claim 8, further comprising at least one driver in electrical communication with the circuit board, the driver operable to control the light output of the light-emitting elements, wherein the heat sink and the at least one driver are located on radially opposite sides of the circuit board.

10. The light fixture of claim 1, wherein the reflector has a round profile.

11. The light fixture of claim 1, wherein the plurality of collimators are positioned in a common plane and laterally spaced apart from one another in a non-linear manner.

12. A light fixture comprising:
   a frame supported in a recessed manner relative to a surface, the frame including an opening and supporting a circuit board adjacent the opening;
   a plurality of light-emitting elements supported on the circuit board;
   a plurality of collimators positioned adjacent the light emitting elements, each of the collimators further including an inner wall that to internally reflect the light output of an associated light-emitting element;
   a heat sink for dissipating heat generated by the light-emitting elements;
   a heat pipe extending from the circuit board and passing through the heat sink; and
   a power supply assembly being independent and separate from an electrical junction box and removably supported by the frame, the power supply assembly having a length and a maximum dimension transverse to the length, the maximum dimension of the power supply assembly being less than the inner dimension of the opening to allow the power supply assembly to be removed through the opening in the frame, the power supply assembly including,
   an enclosure having a base, a first inclined wall, and a second inclined wall, the first inclined wall and second inclined wall being joined along an apex edge, the apex edge oriented parallel to the length of the power supply assembly to form a prism shape, and
   a first driver coupled to the first inclined wall and a second driver coupled to the second inclined wall.

13. The light fixture of claim 12, wherein the heat sink includes a plurality of fins.

14. The light fixture of claim 12, wherein the heat sink is connected to the circuit board by angled brackets configured to positioned to space the heat sink above the circuit board relative to the light-emitting elements.

15. The light fixture of claim 12, wherein the circuit board includes a first central axis and the heat sink includes a second central axis oriented parallel to the first central axis.

16. The light fixture of claim 12, wherein the power supply support is removably connected to the frame by a latch.

17. The light fixture of claim 12, further comprising an electrical junction box, wherein the first driver and the second driver are independent from the electrical junction box.

\* \* \* \* \*